(12) United States Patent
Suzuki

(10) Patent No.: US 7,411,881 B2
(45) Date of Patent: Aug. 12, 2008

(54) INFORMATION RECORDING APPARATUS, METHOD AND SYSTEM, WITH INCREASED LIKELIHOOD FOR RECORDING INFORMATION AT APPROPRIATE RECORDING CONDITIONS

(75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 772 days.

(21) Appl. No.: 10/857,858

(22) Filed: Jun. 2, 2004

(65) Prior Publication Data

US 2005/0013226 A1    Jan. 20, 2005

(30) Foreign Application Priority Data

Jun. 2, 2003    (JP) ............................. 2003-156952

(51) Int. Cl.
G11B 7/00    (2006.01)
(52) U.S. Cl. ................................. 369/59.13; 369/47.53
(58) Field of Classification Search ............... 369/59.13, 369/47.53
See application file for complete search history.

(56) References Cited

U.S. PATENT DOCUMENTS

| | | | |
|---|---|---|---|
| 5,502,702 A | 3/1996 | Nakajo | |
| 5,666,331 A * | 9/1997 | Tokuyama et al. | 369/14 |
| 6,453,369 B1 | 9/2002 | Imamura et al. | |
| 6,654,325 B1 | 11/2003 | Minemura et al. | |
| 6,912,188 B2 * | 6/2005 | Morishima | 369/47.53 |
| 7,072,260 B1 * | 7/2006 | Sako et al. | 369/53.21 |
| 7,120,272 B2 * | 10/2006 | Guiguizian | 382/100 |
| 7,161,881 B2 * | 1/2007 | Pereira | 369/47.51 |
| 7,254,102 B2 | 8/2007 | Ohgake | |
| 2002/0181365 A1 | 12/2002 | Nakajo | |

FOREIGN PATENT DOCUMENTS

| | | |
|---|---|---|
| EP | 1 128 383 A2 | 8/2001 |
| JP | H09-326160 | 12/1997 |
| JP | H11-213551 | 8/1999 |
| JP | 2002-056531 A | 2/2002 |
| WO | WO 01/11614 A1 | 2/2001 |
| WO | WO 03/030153 A2 | 4/2003 |

OTHER PUBLICATIONS

Partial European Search Report dated Mar. 9, 2006.
Communication from the Japanese Patent Office for Japanese Patent No. 2003-156952 dated Oct. 25, 2007.

* cited by examiner

Primary Examiner—Gautam R Patel
(74) Attorney, Agent, or Firm—Dickstein Shapiro LLP

(57) ABSTRACT

An information recording apparatus records information on an information recording medium by focusing a light beam emitted from a light source on the information recording medium. The apparatus has an information reading device of a type of the information recording medium, a recording strategy storage device, and an unknown information recording medium notification device. The information reading device is configured to read information as to the type of the information recording medium recorded thereon. The storage device is configured to store a recording strategy corresponding to an information recording medium type. The notification device is configured to send an unknown information recording medium notification, when the recording strategy corresponding to the type of the information recording medium is not found in the storage device.

30 Claims, 13 Drawing Sheets

FIG. 6

| MANUFACTURER ID | MEDIA TYPE ID | Ttop | Tmp |
|---|---|---|---|
| A | 01 | 2.0T | 0.87T |
| A | 02 | 2.1T | 0.74T |
| B | 01 | 1.9T | 0.80T |
| C | 01 | 2.0T | 0.80T |
| DEFAULT | | 1.8T | 0.70T |
| | | | |
| | | | |
| | | | |

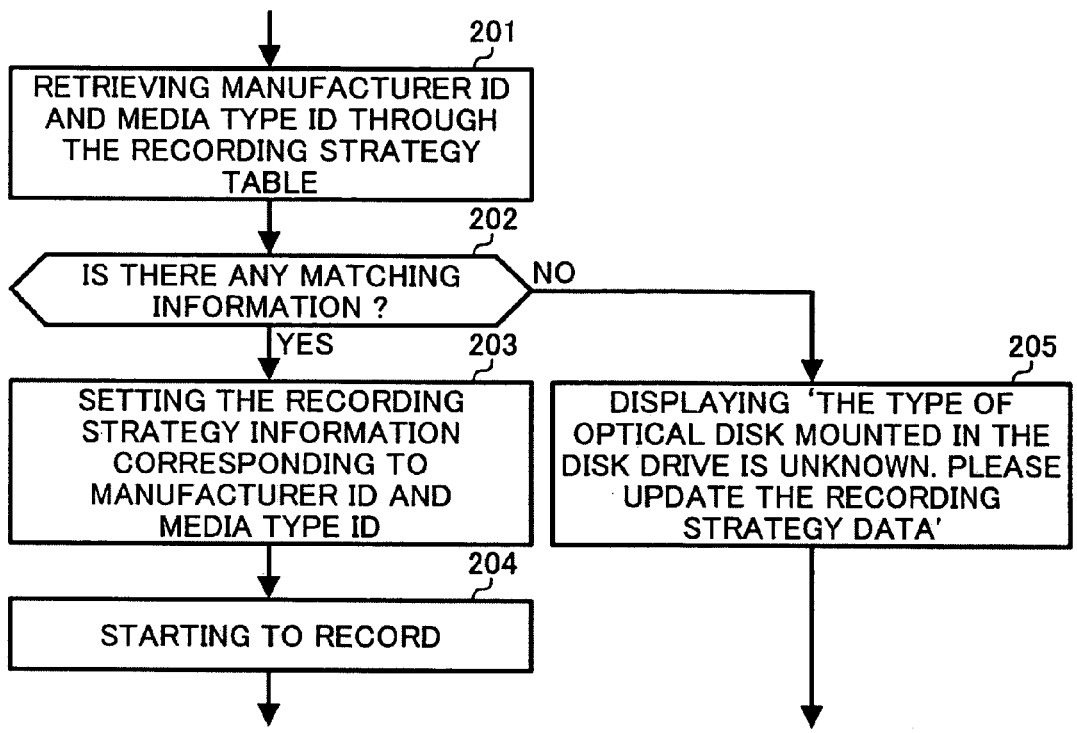
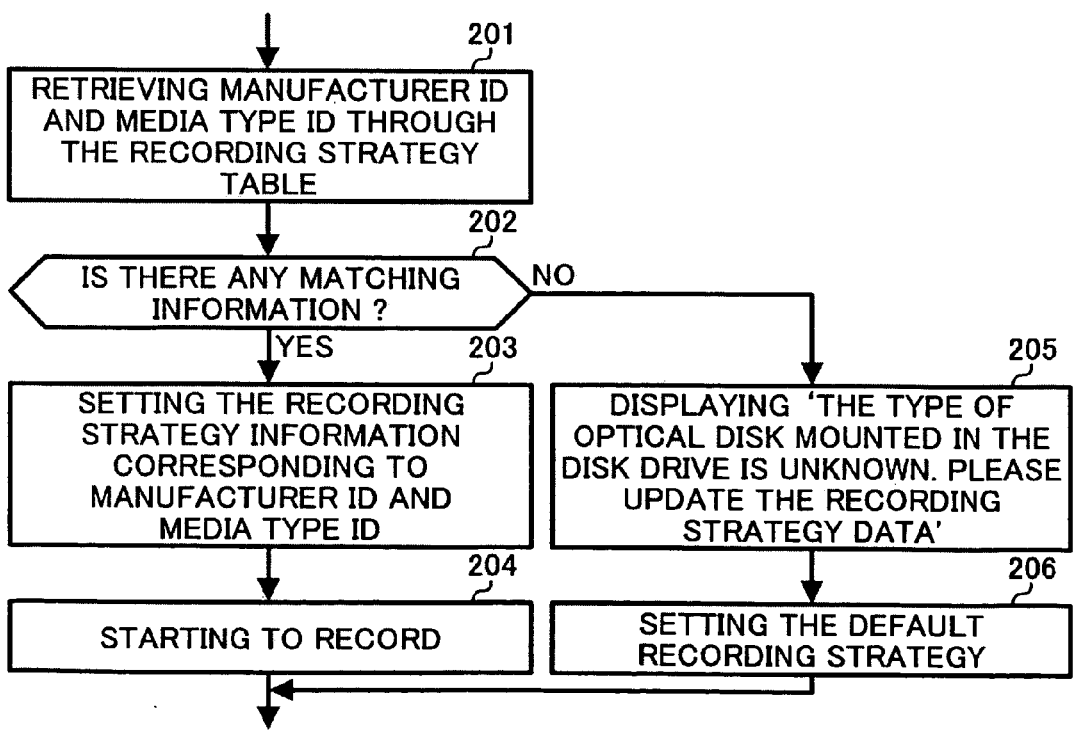

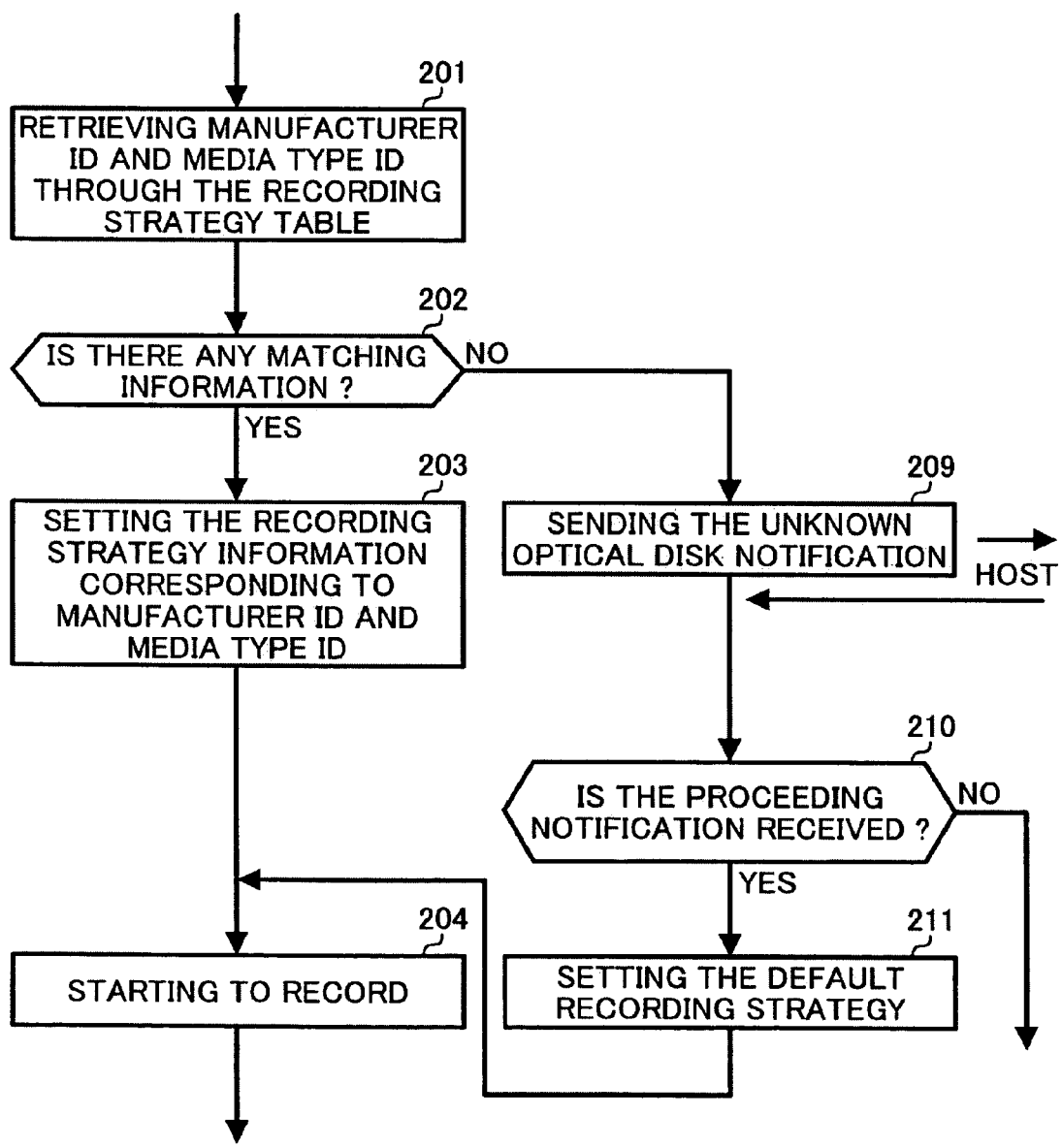

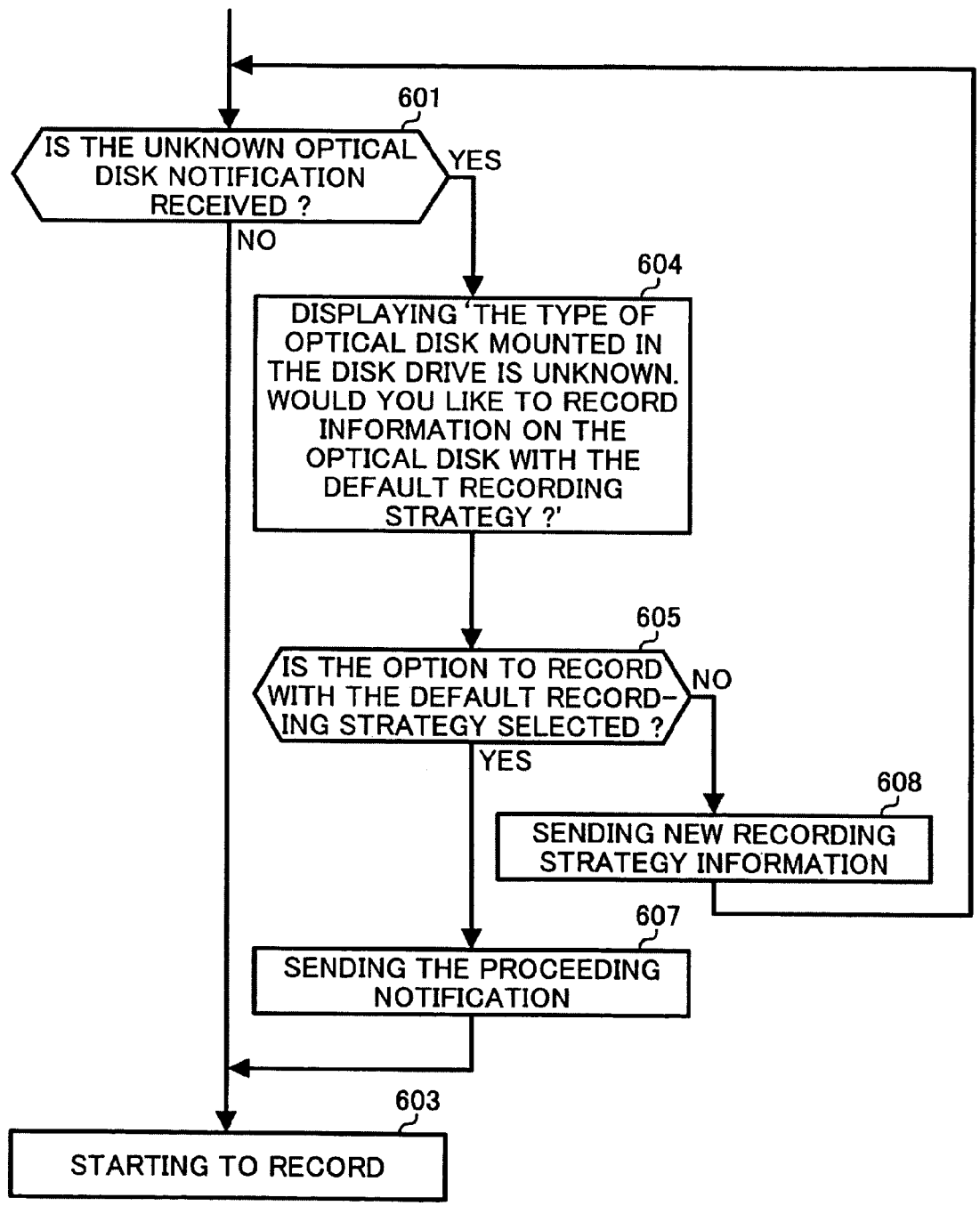

INFORMATION RECORDING APPARATUS, METHOD AND SYSTEM, WITH INCREASED LIKELIHOOD FOR RECORDING INFORMATION AT APPROPRIATE RECORDING CONDITIONS

BACKGROUND OF THE INVENTION

1. Field of the Invention

The present invention relates to an information recording apparatus including an optical disk drive, software for controlling an information recording apparatus, a control device for an information recording apparatus, an information recording medium and an information recording method.

2. Description of the Related Art

Japanese Patent Laid-Open No. 2001-283443 Official Gazette refers to an optical recording medium for an optical disk drive that can reproduce or record information at the optimum condition stably. The recording medium has a recordable recording layer on a substrate. The recording layer has a manufacturer recording area in which the manufacturer can record information. In the manufacturer recording area, drive control information peculiar to the optical recording medium is recorded. When an optical disk drive records information on an optical recording medium, the optical disk drive reproduces or records information at the optimum condition based on the drive control information recorded on the optical recording medium.

Japanese Patent Laid-Open No. 2002-334433 Official Gazette discloses an information recording method which is directed to keep enough time for heating and cooling by simple pulse control method, to record marks having intended length at high speed without increasing the speed of the light source driving portion. According to the information recording method, the optical recording medium can be heated and cooled sufficiently by adding a heat pulse Hmp and cool pulse Cmp in response per mark data length 2T added. In this regard, the erase pulse E2 or E3 whose light power is higher or lower than erase power Pe1 to control the mark length is added at the head of the erase area which is placed on the back of the rearmost cool pulse Cend. Therefore, the position of the rear edge of the mark can be controlled corresponding to the mark length with high accuracy by the simple pulse control method. That is, in this method, it is only necessary to set the level of rearmost cool pulse Cend, and second erase power of erase pulse E2 or E3 or third erase power in combination, and the pattern of each heat pulse in the multi pulse train does not need to be controlled.

Generally, the recording condition, including the power and the width of the recording pulse (for example the respective parameter described in Japanese Patent Laid-Open No. 2002-334433 Official Gazette), should be determined when an information recording apparatus records data on optical disks, including CD-R/RW, DVD-R/RW, DVD+R/RW. The recording condition is referred to as the write strategy. The optimum write strategy depends on the characteristics of the recording material and the substrate of the optical disk. So the optimum write strategy differs according to the manufacturer and the kind of optical disk.

In Japanese Patent Laid-Open No. 2001-283443 Official Gazette, the optimum write strategy information is recorded on the optical disk in advance, and the information recording apparatus refers to the optimum write strategy information retrieved from the optical disk, and determines the optimum write strategy. But it is not necessarily the case that the optimum write strategy information recorded on the optical disk can apply to any information recording apparatus made by any manufacturer without modification. This is because optical system parameters, including the wavelength of the light emitted from the laser diode and the numerical aperture (NA) of the objective lens, and the rise time of the recording pulses, differ depending on the manufacturers of the information recording apparatuses. Accordingly, some of the information recording apparatuses cannot record information on the optical recording medium, described in Japanese Patent Laid-Open No. 2001-283443 Official Gazette, at the optimum condition.

At the same time, there is a method such that optical disk information, including manufacturer code, classification and version number corresponding to the respective optical disk is recorded on the optical disk, while optimum write strategy information of various optical disks is stored, correlating with the optical disk information, in a memory of the information recording apparatus. In this method, the information recording apparatus retrieves the optical disk information, including manufacturer code, classification and version number from the loaded optical disk before recording information on the optical disk. The optical disk information is checked against the optimum write strategy information stored in advance in the write strategy information table. When the write strategy corresponding to the optical disk is found out, the information recording apparatus set the write strategy for recording information.

The optimum write strategy can be determined for predetermined combinations of an information recording apparatus (manufacturer) and an optical disk by this method. However, when an optical disk whose write strategy information is not stored in the write strategy table of the information recording apparatus (an optical disk whose write strategy information is unknown) is loaded, the information recording apparatus cannot determine the optimum write strategy. Accordingly, the information recording apparatus cannot record information at the optimum recording condition on some optical recording media.

SUMMARY OF THE INVENTION

A general object of the present invention is to provide an information recording apparatus, an information recording system and an information recording method, that increases the possibility for recording information on information recording medium at an applicable recording condition, even when the recording strategy corresponding to the type of the information recording medium is unknown.

Another general object of the invention is to provide a computer, that can control an information recording apparatus so as to increase the possibility for recording information on an information recording medium at an applicable recording condition, even when the recording strategy corresponding to the type of the information recording medium is unknown.

Another general object of the invention is to provide a computer program product and a computer readable storage medium which stores a computer program, that can execute a computer to control an information recording apparatus so as to increase the possibility for recording information on an information recording medium at an applicable recording condition, even when the recording strategy corresponding to the type of the information recording medium is unknown.

In order to achieve at least one of the above mentioned objects, there is provided according to a first aspect of the present invention, an information recording apparatus for recording information on an information recording medium by focusing a light beam emitted from a light source on the information recording medium. The information recording apparatus has an information reading device of a type of the information recording medium, a recording strategy storage device, and an unknown information recording medium notification device. The information reading device of a type of the information recording medium is configured to read information as to the type of the information recording medium recorded thereon. The recording strategy storage device is configured to store a recording strategy corresponding to an information recording medium type. The unknown information recording medium notification device is configured to send an unknown information recording medium notification, when the recording strategy corresponding to the type of the information recording medium is not found out in the recording strategy storage device.

According to the above mentioned information recording apparatus, the possibility for recording information on the information recording medium at an applicable recording condition increases, even when the recording strategy corresponding to the type of the information recording medium is not found out in the recording strategy storage device. This is mainly because the above mentioned information recording apparatus sends the unknown information recording medium notification.

In order to achieve at least one of the above mentioned objects, there is provided according to a second aspect of the present invention, a computer program product for a computer which is connectable to an information recording apparatus which is configured to record information on an information recording medium by focusing a light beam emitted from a light source on the information recording medium.

The information recording apparatus has an information reading device of a type of the information recording medium, a recording strategy storage device, and an unknown information recording medium notification device. The information reading device of a type of the information recording medium is configured to read information as to the type of the information recording medium recorded thereon. The recording strategy storage device is configured to store a recording strategy corresponding to an information recording medium type. The unknown information recording medium notification device is configured to send an unknown information recording medium notification, when the recording strategy corresponding to the type of the information recording medium is not found in the recording strategy storage device.

The computer program product enables the computer to execute a process. The process has the step of controlling a message sending device so as to send a message telling a user that the information recording medium is an unknown information recording medium, in response to the unknown information recording medium notification from the information recording apparatus. The message sending device can be a display device, for example.

According to the above mentioned computer program product, the possibility for recording information on the information recording medium at an applicable recording condition increases, even when the recording strategy corresponding to the type of the information recording medium is not found in the recording strategy storage device. This is mainly because the computer program product makes the computer control the message sending device so as to send a message telling a user that the information recording medium is an unknown information recording medium. So the message sending device can call the attention of the user by means of the message.

In order to achieve at least one of the above mentioned objects, there is provided according to a third aspect of the present invention, a computer that is connectable to an information recording apparatus which is configured to record information on an information recording medium by focusing a light beam emitted from a light source on the information recording medium.

The information recording apparatus has an information reading device of a type of the information recording medium, a recording strategy storage device, and an unknown information recording medium notification device. The information reading device of a type of the information recording medium is configured to read information as to the type of the information recording medium recorded thereon. The recording strategy storage device is configured to store a recording strategy corresponding to an information recording medium type. The unknown information recording medium notification device is configured to send an unknown information recording medium notification, when the recording strategy corresponding to the type of the information recording medium is not found in the recording strategy storage device.

The computer has a message sending device configured to send a message telling a user that the information recording medium is an unknown information recording medium, in response to the unknown information recording medium notification from the information recording apparatus. The message sending device can be a display device, for example.

According to the above mentioned computer, the possibility for recording information on the information recording medium at an applicable recording condition increases, even when the recording strategy corresponding to the type of the information recording medium is not found in the recording strategy storage device. This is mainly because the computer controls the message sending device so as to send a message telling a user that the information recording medium is an unknown information recording medium. So the message sending device can call the attention of the user by means of the message.

In order to achieve at least one of the above mentioned objects, there is provided according to a fourth aspect of the present invention, a computer-readable storage medium for storing a program.

The program is for a computer which is connectable to an information recording apparatus which is configured to record information on an information recording medium by focusing a light beam emitted from a light source on the information recording medium.

The information recording apparatus has an information reading device of a type of the information recording medium, a recording strategy storage device, and an unknown information recording medium notification device. The information reading device of a type of the information recording medium is configured to read information as to the type of the information recording medium recorded thereon. The recording strategy storage device is configured to store a recording strategy corresponding to an information recording medium type. The unknown information recording medium notification device is configured to send an unknown information recording medium notification, when the recording strategy corresponding to the type of the information recording medium is not found in the recording strategy storage device.

The computer program stored in the computer-readable storage medium enables the computer to execute a process. The process has the step of controlling a message sending device so as to send a message telling a user that the information recording medium is an unknown information recording medium, in response to the unknown information recording medium notification from the information recording apparatus. The message sending device can be a display device, for example.

According to the above mentioned computer-readable storage medium, the possibility for recording information on the information recording medium at an applicable recording condition increases, even when the recording strategy corresponding to the type of the information recording medium is not found in the recording strategy storage device. This is mainly because the computer program stored in the computer-readable storage medium makes the computer control the message sending device so as to send a message telling a user that the information recording medium is an unknown information recording medium. So the message sending device can call the attention of the user by means of the message.

In order to achieve at least one of the above mentioned objects, there is provided according to a fifth aspect of the present invention an information recording method for recording information on an information recording medium by focusing a light beam emitted from a light source on the information recording medium.

The information recording method has the steps of reading information as to the type of said information recording medium recorded on the information recording medium, and sending an unknown information recording medium notification, when the recording strategy corresponding to the type of the information recording medium is unknown.

According to the above mentioned information recording method, the possibility for recording information on the information recording medium at an applicable recording condition increases, even when the recording strategy corresponding to the type of the information recording medium is unknown. This is mainly because there is the step of sending an unknown information recording medium notification in the above mentioned information recording method.

In order to achieve at least one of the above mentioned objects, there is provided according to a sixth aspect of the present invention an information recording method for recording information on an information recording medium by focusing a light beam emitted from a light source on the information recording medium.

The information recording method has the steps of reading information as to the type of the information recording medium recorded on the information recording medium, and determining a recording strategy for the information recording medium, when the recording strategy corresponding to the type of the information recording medium is unknown.

According to the above mentioned information recording method, the possibility for recording information on the information recording medium at an applicable recording condition increases, even when the recording strategy corresponding to the type of the information recording medium is unknown. This is mainly because there is the step of determining a recording strategy for the information recording medium in the above mentioned information recording method.

In order to achieve at least one of the above mentioned objects, there is provided according to a seventh aspect of the present invention, an information recording apparatus for recording information on an information recording medium by focusing a light beam emitted from a light source on the information recording medium. The information recording apparatus has an information reading device of a type of the information recording medium, a recording strategy storage device, and a recording strategy determining device.

The information reading device of a type of the information recording medium is configured to read information as to the type of the information recording medium recorded thereon. The recording strategy storage device is configured to store a recording strategy corresponding to an information recording medium type. The recording strategy determining device is configured to determine a recording strategy for an unknown information recording medium, when the recording strategy corresponding to the type of the information recording medium is not found in the recording strategy storage device. The information recording apparatus records information with the recording strategy determined by the recording strategy determining device for an unknown information recording medium.

According to the above mentioned information recording apparatus, the possibility for recording information on the information recording medium at an applicable recording condition increases, even when the recording strategy corresponding to the type of the information recording medium is not found in the recording strategy storage device. This is mainly because the information recording apparatus determines a recording strategy for an unknown information recording medium and records information with the recording strategy.

In order to achieve at least one of the above mentioned objects, there is provided according to an eighth aspect of the present invention, an information recording system which has an information recording apparatus and a computer coupled to each other.

The information recording apparatus is configured to record information on an information recording medium by focusing a light beam emitted from a light source on the information recording medium. The information recording apparatus has an information reading device of a type of the information recording medium, a recording strategy storage device, and an unknown information recording medium notification device. The information reading device of a type of the information recording medium is configured to read information as to the type of the information recording medium recorded thereon. The recording strategy storage device is configured to store a recording strategy corresponding to an information recording medium type. The unknown information recording medium notification device is configured to send an unknown information recording medium notification, when the recording strategy corresponding to the type of the information recording medium is not found in the recording strategy storage device.

The computer has a message sending device configured to send a message telling a user that the information recording medium is an unknown information recording medium, in response to the unknown information recording medium notification from the information recording apparatus. The message sending device can be a display device, for example.

According to the above mentioned information recording system, the possibility for recording information on the information recording medium at an applicable recording condition increases, even when the recording strategy corresponding to the type of the information recording medium is not found in the recording strategy storage device. This is mainly because the information recording apparatus sends an unknown information recording medium notification, and the computer controls the message sending device so as to send a message telling a user that the information recording medium is an unknown information recording medium. So the message sending device can call the attention of the user by means of the message.

In order to achieve at least one of the above mentioned objects, there is provided according to a ninth aspect of the present invention, an information recording apparatus for recording information on an information recording medium by focusing a light beam emitted from a light source on the information recording medium. The information recording apparatus has an information reading means for reading the type of the information recording medium, a recording strategy storage means, and an unknown information recording medium notification means. The information reading means reads information as to the type of the information recording medium recorded thereon. The recording strategy storage means stores a recording strategy corresponding to an information recording medium type. The unknown information recording medium notification means sends an unknown information recording medium notification, when the recording strategy corresponding to the type of the information recording medium is not found in the recording strategy storage means.

According to the above mentioned information recording apparatus, the possibility for recording information on the information recording medium at an applicable recording condition increases, even when the recording strategy corresponding to the type of the information recording medium is not found in the recording strategy storage device. This is mainly because the above mentioned information recording apparatus sends an unknown information recording medium notification.

In order to achieve at least one of the above mentioned objects, there is provided according to a tenth aspect of the present invention, an information recording apparatus for recording information on an information recording medium by focusing a light beam emitted from a light source on the information recording medium. The information recording apparatus has an information reading means of a type of the information recording medium, a recording strategy storage means, and a recording strategy determining means. The information reading means is for reading information as to the type of the information recording medium recorded thereon. The recording strategy storage means is for storing a recording strategy corresponding to an information recording medium type. The recording strategy determining means is for determining a recording strategy for an unknown information recording medium, when the recording strategy corresponding to the type of the information recording medium is not found in the recording strategy storage means.

According to the above mentioned information recording apparatus, the possibility for recording information on the information recording medium at an applicable recording condition increases, even when the recording strategy corresponding to the type of the information recording medium is not found in the recording strategy storage device. This is mainly because the information recording apparatus determines a recording strategy for an unknown information recording medium.

In order to achieve at least one of the above mentioned objects, there is provided according to an eleventh aspect of the present invention, an information recording system which has an information recording apparatus and a computer coupled to each other.

The information recording apparatus which is configured to record information on an information recording medium by focusing a light beam emitted from a light source on the information recording medium. The information recording apparatus has an information reading means of a type of the information recording medium, a recording strategy storage means, and an unknown information recording medium notification means. The information reading means is for reading information as to the type of the information recording medium recorded thereon. The recording strategy storage means is for storing a recording strategy corresponding to an information recording medium type. The unknown information recording medium notification means is for sending an unknown information recording medium notification, when the recording strategy corresponding to the type of the information recording medium is not found in the recording strategy storage means.

The computer has a message sending means for sending a message telling a user that the information recording medium is an unknown information recording medium, in response to the unknown information recording medium notification from the information recording apparatus. The message sending means can be a display means, for example.

According to the above mentioned information recording system, the possibility for recording information on the information recording medium at an applicable recording condition increases, even when the recording strategy corresponding to the type of the information recording medium is not found out in the recording strategy storage means. This is mainly because the information recording apparatus sends an unknown information recording medium notification, and the computer controls the message sending means so as to send a message telling a user that the information recording medium is an unknown information recording medium. So the message sending means can call the attention of the user by means of the message.

Other objects and further features of the present invention will be apparent from the following detailed description when read in conjunction with the accompanying drawings.

BRIEF DESCRIPTION OF THE DRAWINGS

FIG. 6 is an example of content stored in the recording strategy storage device 111, of preferred embodiments in accordance with the present invention.

FIG. 7 is a flow chart which describes the precise operation of the controller 109 of the information recording apparatus, as the algorithm of the program executed by the controller 109, in the first and second embodiments in accordance with the present invention.

FIG. 8 is a flow chart which describes the precise operation of the controller 109 of the information recording apparatus, as the algorithm of the program executed by the controller 109, in the third and fourth embodiments in accordance with the present invention.

FIG. 16 is a flow chart which describes the precise operation of the controller 109 of the information recording apparatus, as the algorithm of the program executed by the controller 109, in the eighth embodiment in accordance with the present invention.

FIG. 17 is a flow chart which describes the precise operation of the CPU 118 of the host computer 105, as the algorithm of the software 113 executed by the CPU 118 of the host computer 105, in the ninth embodiment in accordance with the present invention.

DETAILED DESCRIPTION OF PREFERRED EMBODIMENTS

First Embodiment

Figure 1:
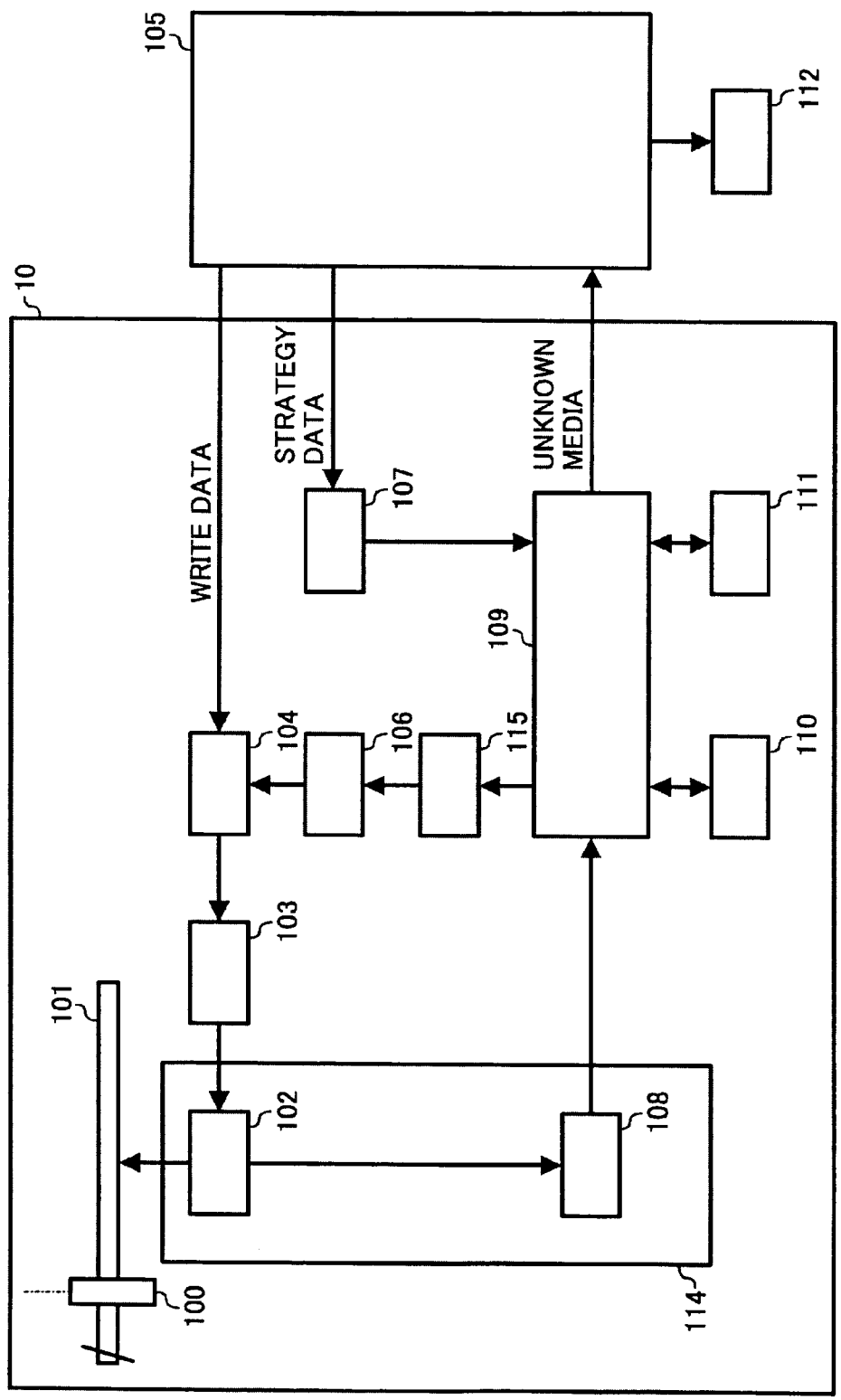
FIG. 1 is a block diagram of the first preferred embodiment of an information recording system which has an information recording apparatus and a host computer coupled to each other, in accordance with the present invention.

FIG. 1 is a block diagram of the first preferred embodiment of an information recording system which has an information recording apparatus and a host computer coupled to each other, relating to the present invention. The information recording apparatus of this embodiment is an optical disk recording apparatus 10 for recording information on an optical disk, including CD-R/RW, DVD-R/RW, and DVD+R/RW, as an information recording medium.

The system of FIG. 1 has a spindle motor 100 which rotates an optical disk 101 as an information recording medium. An optical system 102 can record information on the optical disk 101 by focusing the light beam with write or erase level from the light source 103 on the recording surface of the optical disk 101. The optical system 102 can also read information by focusing the light beam with read level on the recording surface of the optical disk 101, detecting the light reflected from the optical disk 101, and generating a reproducing signal. The optical system and the light source 103 are arranged in an optical head (that is, an optical pick up). The optical head is movable so as to focus the light beam at a desirable position on the optical disk 101. The optical head is not shown in FIG. 1.

Figure 3:
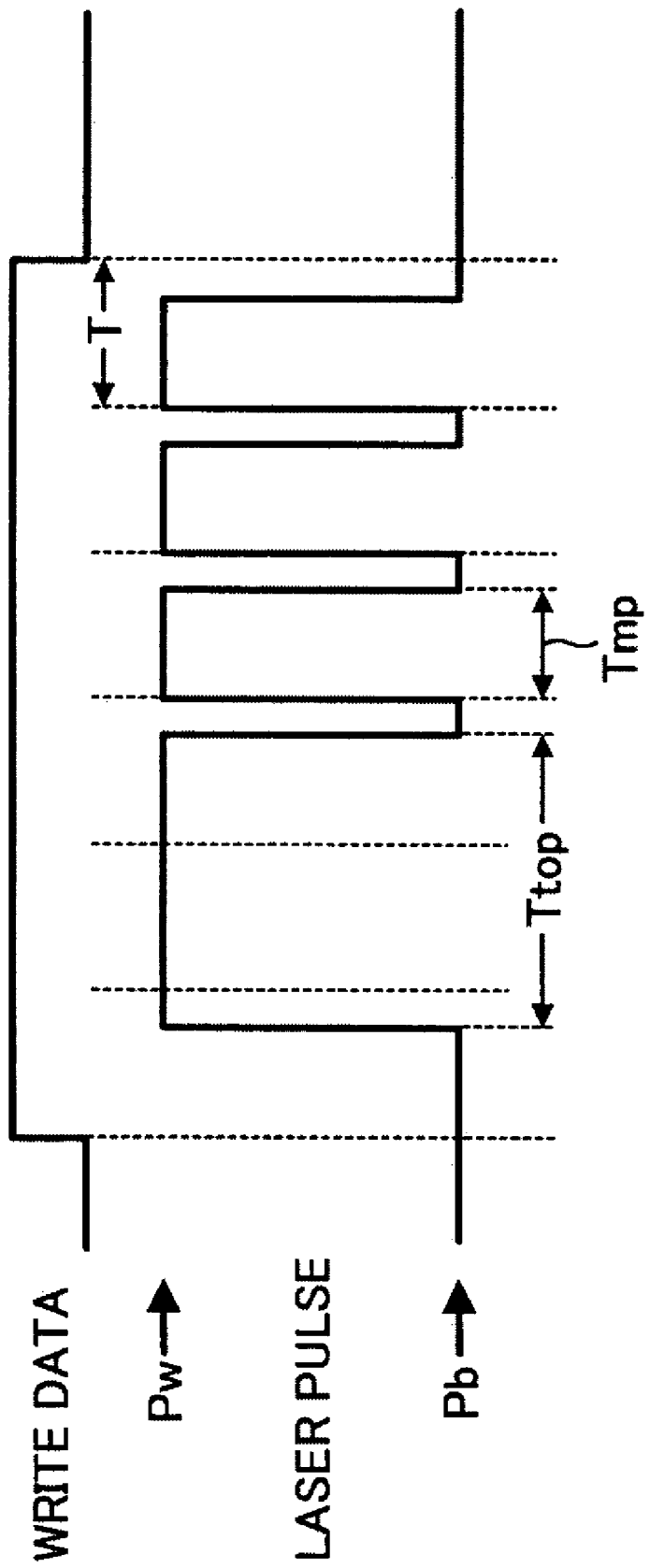
FIG. 3 is an example of the write data and the recording of the optical beam from the light source 103 with pulse modulation pulses corresponding to the write data, of preferred embodiments in accordance with the present invention.

A semiconductor laser is generally used for the light source 103. The light source 103 emits light as it is driven by the laser driver 104. The power of the light beam from the light source 103 is constant when the optical disk recording apparatus 10 is reading information from the optical disk 101, and has modulated pulses when the optical disk recording apparatus 10 is recording information on the optical disk 101. An example of the write data and the recording pulses of the optical beam from the light source 103 with pulse modulation corresponding to the write data is shown in FIG. 3. In FIG. 3, laser pulse indicates the recording pulses, Pw indicates the write power level of the recording pulses, and Pb indicates the bottom power level.

The write data sent from the host computer 105 changes from 3T to 11T by the predetermined length of a channel bit T when the optical disk 101 is a CD or DVD, for example. The recording pulses of the optical beam from the light source 103 consist of divided pulses corresponding to a recording mark, that is, '1' portion of the write data.

The divided pulses to write a recording mark are called a multi-pulse. It is often the case that the length of the head pulse of the divided pulses is set a little longer than the other pulses to accelerate melting of the recording layer by pulling up the temperature of the recording layer. The width of the head pulse is referred as Ttop. The intervals of the divided pulses get together with the length of channel bit T after the fourth channel bit. The length of the divided pulses after the fourth channel bit is referred to as Tmp. Those parameters of recording pulses set in such way as explained are referred to as the pulse strategy or recording strategy.

The recording strategy for the laser driver 104 to drive the light source 103 is set in the recording strategy (hereinafter referred to as just strategy, on occasion) setting device 106, based on the command from the controller 109. A memory can be used as the recording strategy setting device for example. The recording strategies are stored in the recording strategy table, as shown in FIG. 6, corresponding to the type of optical disk 101 (Media Type ID), in the recording strategy storage device 111. The recording strategy is set based on the type of optical disk 101. The Manufacturer ID (FIG. 6) is specific ID information of the manufacturer, indicating which manufacturer produced the optical disk 101. In FIG. 6, the values of Ttop and Tmp (the recording strategy) are set at 2.0T and 0.87T respectively for the optical disk written in the second row of the table. As to the other optical disks, the values of Ttop and Tmp are set at various values depending on the type of the optical disk.

An optical disk type discriminating device 108 (FIG. 1), as an information recording medium discriminating device, discriminates the type of optical disk 101. When the optical disk 101 is mounted, the optical disk type discriminating device 108 decodes the reproducing signal sent from the optical system 102, obtains the optical disk type information recorded on the optical disk 101 in advance, and sends the optical disk type information to the controller 109. The optical disk type information comprises Manufacturer ID, which indicates the manufacturer of the optical disk 101, and Media Type ID, which indicates the type of the optical disk 101.

That is, the information reading device of the type of the information recording medium 114, that reads the information as to the type of optical disk 101 recorded thereon, comprises the optical system 102 and the optical disk type discriminating device, in this embodiment.

Generally, a microcomputer is used as the controller 109. The controller 109 controls the entire operation of the optical disk recording apparatus 10, determines the recording strategy based on the optical disk type information from the optical disk type discriminating device 108 and the contents of the recording strategy table stored in the recording strategy storage device 111 written precisely below. Then, the controller 109 sets the recording strategy of the recording strategy setting device 106. The CPU in the controller 109 runs programs stored in the program ROM as a part of the software executes the operations of the controller 109 explained above. The laser driver 104 drives the light source 103, modulating the write data from the host computer 105 based on the recording strategy configured in the recording strategy setting device 106.

Thus, the controller 109 executes the operation of the recording strategy determining device 115. The recording strategy determining device 115 enables the optical disk recording apparatus 10 to record information on the optical disk 101 based on the recording strategy corresponding to information as to the type of optical disk 101 read by the optical system 102 and the optical disk type discriminating device 108, when the optimum recording strategy information corresponding to the information as to the type of optical disk 101 is stored in the recording strategy storage device 111.

The recording strategy storage device 111 stores the recording strategy table, including the information of various recording strategies. A nonvolatile memory, including Flash ROM, is preferably used as the recording strategy storage device 111 written precisely below. FIG. 6 shows an example of content stored in the recording strategy storage device 111. That is, the optimum Ttop and Tmp are stored corresponding to each pair of Manufacturer ID, which indicates the manufacturer of optical disk 101, and Media type ID, which indicates the type of optical disk 101. The recording strategy table shown in FIG. 6 is an example of content stored in the recording strategy storage device 111. The recording strategy storage device 111 can store other recording strategy information, including parameters of pulses and the recording power, and other information to discriminate the optical disk 101.

The parameters including Ttop and Tmp are stored in the recording strategy table shown in FIG. 6 as the optimum recording strategy. In FIG. 6 (Ttop, Tmp) equals (2.0T, 0.87T) for the optical disk 101 manufactured by manufacturer A, whose type is 01. (Ttop, Tmp) equals (2.1T, 0.74T) for the optical disk 101 of Type 02 manufactured by the same manufacturer. A recording strategy named 'Default' is stored in the last row of the recording strategy table in FIG. 6. The recording strategy 'Default' includes parameters that are referred to when the optical disk type information mounted in the optical disk recording apparatus 10 does not match Manufacturer ID, which indicate the manufacturer of optical disk 101, and Media type ID, which indicate the type of optical disk 101.

Figure 10:
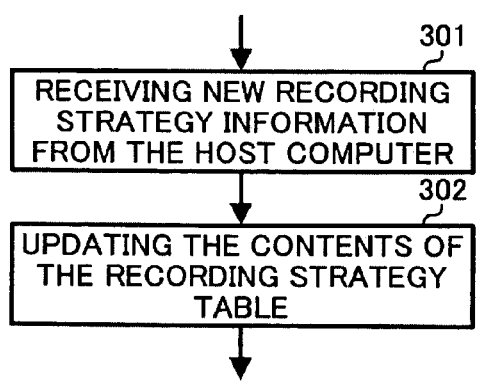
FIG. 10 is a flow chart of an operation executed by the recording strategy updating device 107 in the first embodiment in accordance with the present invention.

The recording strategy updating device 107 (FIG. 1) updates the content stored in the recording strategy storage device 111. The CPU in the controller 109 running a program stored in the program ROM as a part of the software executes the operation of the recording strategy updating device 107. A flow chart of the operation executed by the recording strategy updating device 107 is shown in FIG. 10. The recording strategy updating device 107 receives new recording strategy information that should be stored in the recording strategy storage device 111 from the host computer 105 in step 301. After that, the recording strategy updating device 107 updates the contents of the recording strategy table stored in the recording strategy storage device 111, in step 302. The optical disk recording apparatus 10 can record information based on the optimum recording strategy on more types of optical disk 101, and can respond to an increase of the manufacturer of the optical disk, by updating the recording strategy as needed.

The display device 112 (FIG. 1) can show messages thereon and notify users. The display device 112 is used as a message sending device in this embodiment. Another device, including a device that sends a message by voice, can be used as the message sending device. The host computer 105 transfers the write data to the laser driver 104 and the new recording strategy information to the recording strategy updating device 107 as needed. The CPU 118 of the host computer 105 displays predetermined messages on the display device 112 based on predetermined notification from the controller 109. In addition, the control program storage device 110 stores a control program that is executed by the CPU of the controller 109.

Before recording, the CPU of the controller 109 searches for the optimum recording strategy corresponding to the optical disk 101 mounted in the optical disk recording apparatus 10 from the recording strategy table stored in the recording strategy storage device 111 based on the optical disk type information obtained by the optical disk type discriminating device 108. The CPU sets the optimum recording strategy corresponding to the optical disk 101, to the recording strategy setting device 106. When the optimum recording strategy corresponding to the optical disk 101 is not found in the recording strategy table, the CPU of the controller 109 sends an unknown optical disk notification, that the optical disk 101 is an optical disk whose type is unknown, to the host computer 105. That is, the controller 109 executes the operation of the unknown information recording medium notification device which sends the unknown information recording medium notification, that the recording strategy corresponding to the optical disk 101 is not found in the recording strategy table, in this embodiment.

The CPU 118 of the host computer 105 displays the message (that the optimum recording strategy of the optical disk 101 is unknown) on the display device 112, based on the unknown optical disk notification from the controller 109. The exact language of the message may be selected as desired. For example, such message as 'It is an unknown medium' can be used.

Second Embodiment

Figure 2:
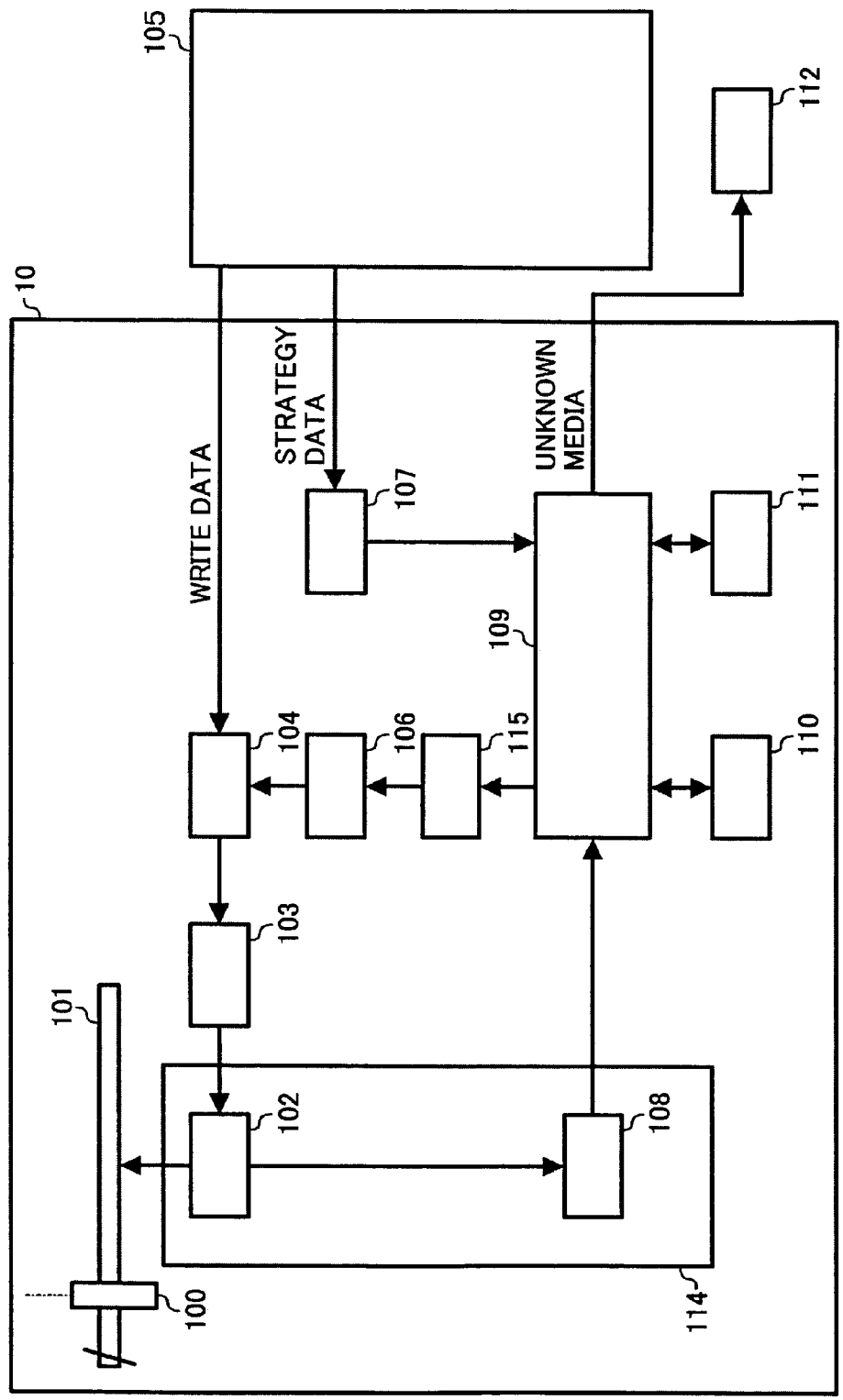
FIG. 2 is a block diagram of the second preferred embodiment of an information recording system which has an information recording apparatus and a host computer coupled to each other, in accordance with the present invention.

FIG. 2 is a block diagram of the second preferred embodiment of an information recording system which has an information recording apparatus and a host computer coupled to each other, in accordance with the present invention. The second embodiment is different from the first embodiment in that the display device 112 receives messages directly from the controller 109 in the second embodiment. Before recording, the CPU of the controller 109 searches for the optimum recording strategy corresponding to the optical disk 101 mounted in the optical disk recording apparatus 10, from the recording strategy table stored in the recording strategy storage device 111, based on the optical disk type information obtained by the optical disk type discriminating device 108. The CPU installs the optimum recording strategy corresponding to the optical disk 101 on the recording strategy setting device 106. When the optimum recording strategy corresponding to the optical disk 101 is not found in the recording strategy table, the CPU of the controller 109 causes a message, to the effect that the optical disk 101 is an optical disk whose type is unknown, to be displayed on the display device 112. The exact words of the message can be selected as desired. For example, such message as 'It is an unknown medium' can be used.

FIG. 7 is a flow chart which describes the precise operation of the controller 109, as the algorithm of the program executed by the controller 109, in the first and second embodiment in accordance with the present invention. This operation is executed by the CPU of the controller 109 before the optical disk recording apparatus 10 starts to record information on the optical disk 101 mounted in the optical disk recording apparatus 10.

When the optical disk 101 is mounted, the optical disk type discriminating device 108 decodes the reproducing signal sent from the optical system 102, obtains the optical disk type information recorded on the optical disk 101 in advance, and sends the optical disk type information to the controller 109. The optical disk type information comprises Manufacturer ID, which indicates the manufacturer of the optical disk 101, and Media Type ID, which indicates the type of the optical disk 101. In step 201, the CPU of the controller 109 retrieves the optical disk type information that matches the optical disk type information sent from the optical disk type discriminating device 108, through the recording strategy table stored in the recording strategy storage device 111.

The CPU of the controller 109 executes the operation described in step 203, when the optical disk type information (Manufacturer ID which indicates the manufacturer of the optical disk 101 and Media Type ID which indicates the type of the optical disk 101) is found in the recording strategy table. In contrast, the CPU of the controller 109 executes the operation described in step 205, when the optical disk type information is not found in the recording strategy table.

In step 203, the optical disk type information that is sent from the optical disk type discriminating device 108 exists in the recording strategy table. So the CPU of the controller 109 sets the optimum recording strategy corresponding to the optical disk type information sent from the optical disk type discriminating device 108, to the recording strategy setting device 106. In step 204, the laser driver 104 drives the light source 103 based on the recording strategy set by the recording strategy setting device 106. The optical disk recording apparatus 10 records information on the optical disk 101 by the light beam emitted from the light source 103.

In step 205, the optical disk type information that is sent from the optical disk type discriminating device 108 does not exist in the recording strategy table. So the CPU of the controller 109 determines that the optical disk 101 mounted in the optical disk recording apparatus 10 is an optical disk whose optimum recording strategy is unknown (the optimum strategy of the optical disk 101 cannot be determined). So the CPU of the controller 109 displays the message that the optical disk 101 mounted in the optical disk recording apparatus 10 is an optical disk whose optimum recording strategy is unknown, on the display device 112, via the CPU 118 of the host computer 105 or directly. The message is 'The type of optical disk mounted in the disk drive is unknown. Please update the recording strategy data,' for example. In this case, the CPU of the controller 109 restricts that the optical disk recording apparatus 10 records information on the optical disk 101. The restriction of recording is made by the CPU that controls the laser driver 104 for example.

As to step 205, the CPU of the controller 109 displays the message on the display device 112 directly in the second embodiment. In the first embodiment, the CPU of the controller 109 notifies that the optical disk 101 mounted in the optical disk recording apparatus 10 is an optical disk whose optimum recording strategy is unknown, to the CPU 118 of the host computer 105. The notification is an appropriate error code for example. After that, the CPU 118 of the host computer 105 tells users that the optical disk 101 mounted in the optical disk recording apparatus 10 is an optical disk whose optimum recording strategy is unknown, by a message such as 'The type of optical disk mounted in the disk drive is unknown. Please update the recording strategy data.'

In addition, the message such as 'Please update the recording strategy data' is not necessarily needed. It may be enough that the CPU of the controller 109 simply notifies the host computer 105 or displays on the display device 112 that the optical disk 101 mounted in the optical disk recording apparatus 10 is an optical disk whose optimum recording strategy is unknown.

In the first and second embodiments explained above, the optical disk recording apparatus 10 can notify users when the optical disk 101 mounted in the optical disk recording apparatus 10 is an optical disk whose optimum recording strategy is unknown. Accordingly, the possibility is reduced that the optical disk recording apparatus 10 records information on the optical disk 101 under bad recording conditions. Moreover, the optical disk recording apparatus 10 avoids recording information on the optical disk 101 with a recording strategy which is not optimum by not recording information on the optical disk 101 when the optical disk 101 is an optical disk whose optimum recording strategy is unknown. So the possibility is reduced that the optical disk recording apparatus 10 records information on the optical disk 101 under bad recording conditions. There is a possibility not only that the information recorded cannot be read but that information which has been recorded on the optical disk 101 cannot be read if the information recorded is index information such as directory information, when the optical disk recording apparatus 10 records information under bad recording conditions.

In addition, the CPU of the controller 109 in the first and second embodiment notifies the host computer 105 or displays on the display device 112 that the recording strategy information should be updated. This enables the user to obtain a more appropriate recording strategy from the manufacturer of the optical disk recording apparatus 10 and to update the information for the optical disk 101 stored in the optical disk recording apparatus 10, including recording strategy information and optical disk type information. When the optimum recording strategy of the optical disk 101 is stored in the recording strategy storage device 111 by updating the recording strategy information, the optical disk recording apparatus 10 can record information on the optical disk 101 with the optimum recording strategy.

The recording strategy information that should be updated can be uploaded onto the web site of the manufacturer of the optical disk recording apparatus 10 at regular intervals, for example. In the first and second embodiments, users can download the recording strategy information from the web site and send the recording strategy information from the host computer 105 (the user's personal computer) to the recording strategy updating device 107 of the optical disk recording apparatus 10. The operation to send the recording strategy is executed by the CPU 118 of the host computer 105 and the recording strategy updating device 107. In this case, the recording strategy updating device 107 receives the recording strategy information that is about to be updated from the CPU 118 of the host computer 105 and updates the content of the recording strategy storage device 111 as described in FIG. 10. That is, the recording strategy updating device 107 updates the recording strategy information data of the predetermined optical disk 101 corresponding to the recording strategy information data received from the host computer.

The optical disk recording apparatus 10 and the host computer 105 can be made up so as to update not only the recording strategy information but also the control program of the optical disk recording apparatus 10 when updating the contents of the recording strategy storage device 111. In this case, the user can define new parameters of the recording strategy and add to the recording strategy storage device 111. So the optical disk recording apparatus 10 can configure better parameters of the recording strategy. The CPU of the controller 109 displays the message that the optical disk 101 mounted in the optical disk recording apparatus 10 is an optical disk whose optimum recording strategy is unknown, on the display device 112, via the CPU 118 of the host computer 105 or directly. The message is 'The type of optical disk mounted in the disk drive is unknown. Please update the recording strategy data or the control program of the optical disk recording apparatus 10 in updating the recording strategy in addition to the recording strategy data,' for example.

Figure 11:
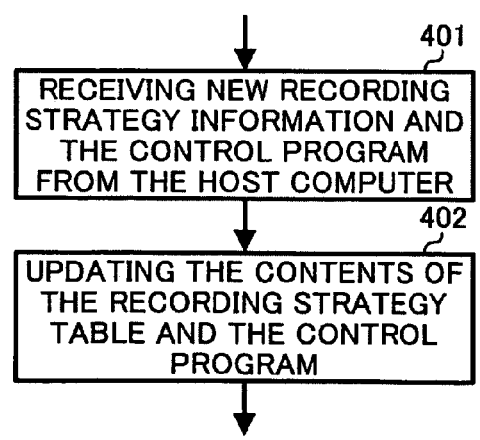
FIG. 11 is a flow chart of another operation executed by the recording strategy updating device 107 in the first embodiment in accordance with the present invention.

FIG. 11 is a flow chart of another operation executed by the recording strategy updating device 107 in this embodiment. The recording strategy updating device 107 receives the recording strategy information and the control program of the optical disk recording apparatus that is about to be updated from the CPU 118 of the host computer 105 in step 401. After that, the recording strategy updating device 107 updates the content of the recording strategy storage device 111 in step 402. That is, the recording strategy updating device 107 updates the recording strategy information data of the predetermined optical disk 101 corresponding to the recording strategy information data received from the host computer, or add the new recording strategy information received from the host computer 105. The recording strategy updating device 107 also updates the control program of the optical disk recording apparatus 10 to update the contents of the recording strategy storage device 111 by the control program received from the host computer 105. That is, the recording strategy updating device 107 can update not only the information of the recording strategy storage device 111 but also the control program of the optical disk recording apparatus 10 including the recording strategy information.

Third and Fourth Embodiments

FIG. 8 is a flow chart which describes the precise operation of the controller 109, as the algorithm of the program executed by the controller 109, in the third and fourth embodiments in accordance with the present invention. This operation is executed by the CPU of the controller 109. In the third and fourth embodiments, the CPU of the controller 109 does the operation described in FIG. 8 instead of the operation described in FIG. 7 in the first and second embodiments, respectively. The operation in the flow chart of FIG. 8 has step 206 in addition to the operation of FIG. 7. The operation of step 206 is executed after step 205 of FIG. 7.

In step 206, as the optical disk 101 mounted in the optical disk recording apparatus 10 is an optical disk whose optimum recording strategy is unknown, the CPU of the controller 109 sets the recording strategy corresponding to the strategy name 'Default' in the recording strategy table stored in the recording strategy storage device 111, to the recording strategy setting device 106. The laser driver 104 drives the light source 103 based on the recording strategy being set by the recording strategy setting device 106 and the write data sent from host computer 105. The optical disk recording apparatus 10 records information on the optical disk 101 by the light beam emitted from the light source 103. Accordingly, the controller 109 executes the operation of the default recording strategy setting device in this embodiment. The default recording strategy setting device determines the recording strategy of unknown optical disk (the recording strategy corresponds to the strategy named 'Default' in this embodiment) to record information on the unknown optical disk, when the optical disk type information that is sent from the optical disk type discriminating device 108 does not exist in the recording strategy table.

The recording strategy corresponding to the strategy name 'Default' is not necessarily the optimum strategy for the optical disk 101. The recording strategy corresponding to the strategy name 'Default' is set so as to record information on the optical disk 101 with such quality, however, that there is not much trouble to read out the information recorded on the optical disk 101, whatever type the optical disk 101 is. Such recording strategy can be obtained by averaging the parameters of the optimum recording strategies corresponding to many types of optical disks, for example.

In the third and fourth embodiments, the optical disk recording apparatus 10 can notify users when the optical disk 101 mounted in the optical disk recording apparatus 10 is an optical disk whose optimum recording strategy is unknown. So the optical disk recording apparatus 10 can make users feel like updating the recording strategy information. In addition, the user has an alternative to record information on the optical disk mounted in the optical disk recording apparatus 10 under passable conditions promptly. It is convenient for the user who does not have enough time to update the recording information when the user starts recording. In this case, the quality of the recording can be acceptable, though it may not be the best quality.

Fifth and Sixth Embodiments

Figure 4:
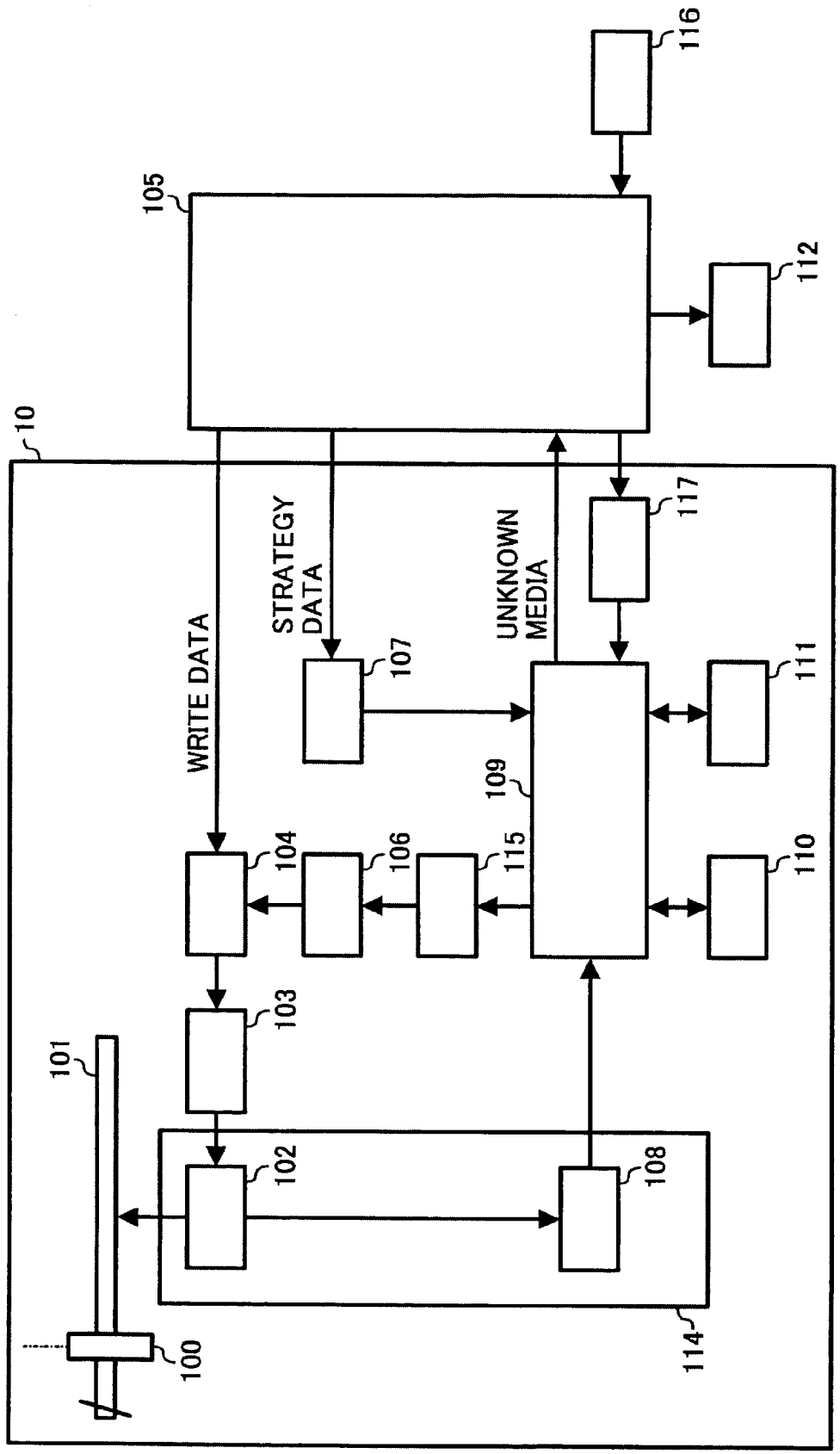
FIG. 4 is a block diagram of the fifth preferred embodiment of an information recording system which has an information recording apparatus and a host computer coupled to each other, in accordance with the present invention.
Figure 5:
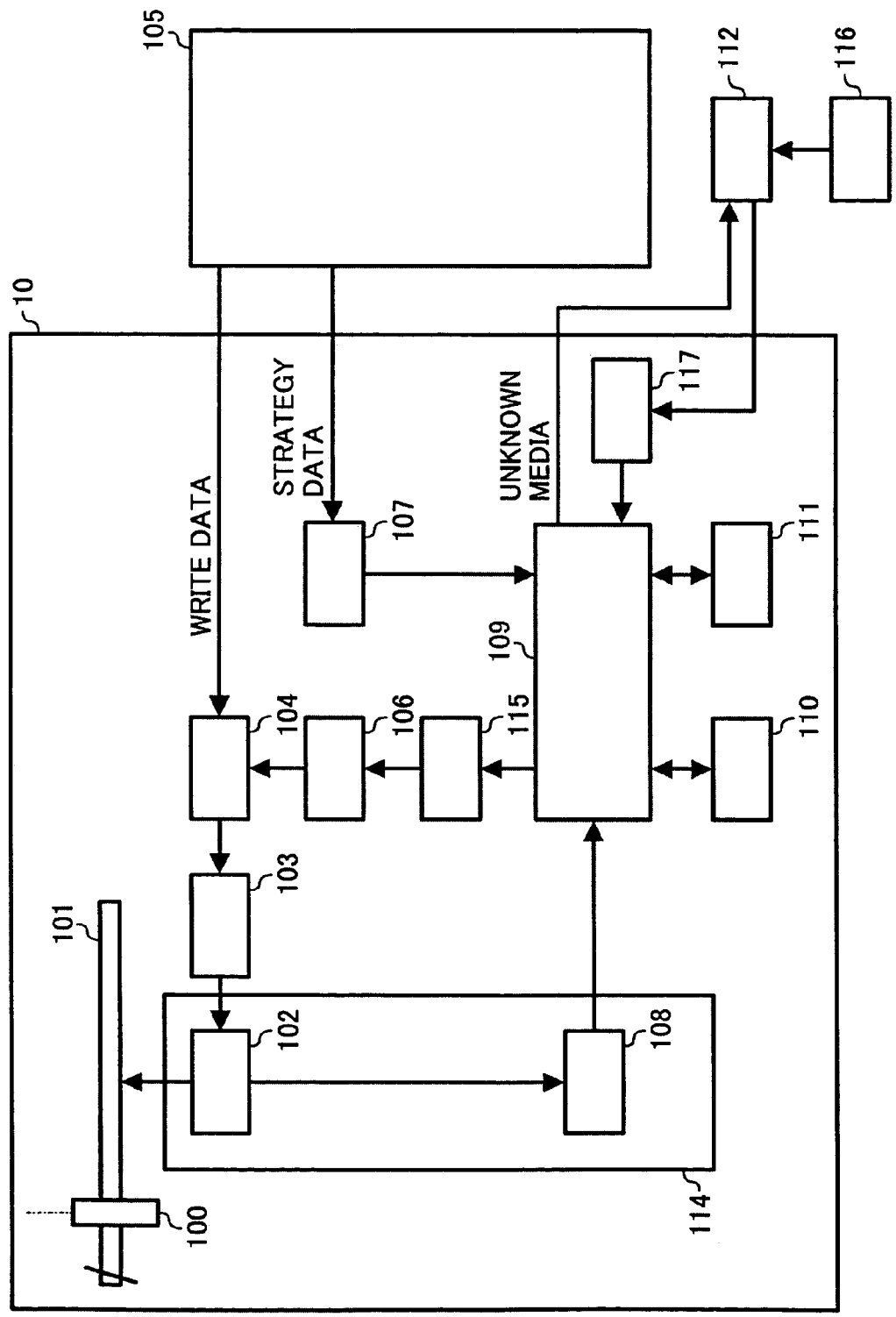
FIG. 5 is a block diagram of the sixth preferred embodiment of an information recording system which has an information recording apparatus and a host computer coupled to each other, in accordance with the present invention.
Figure 9:
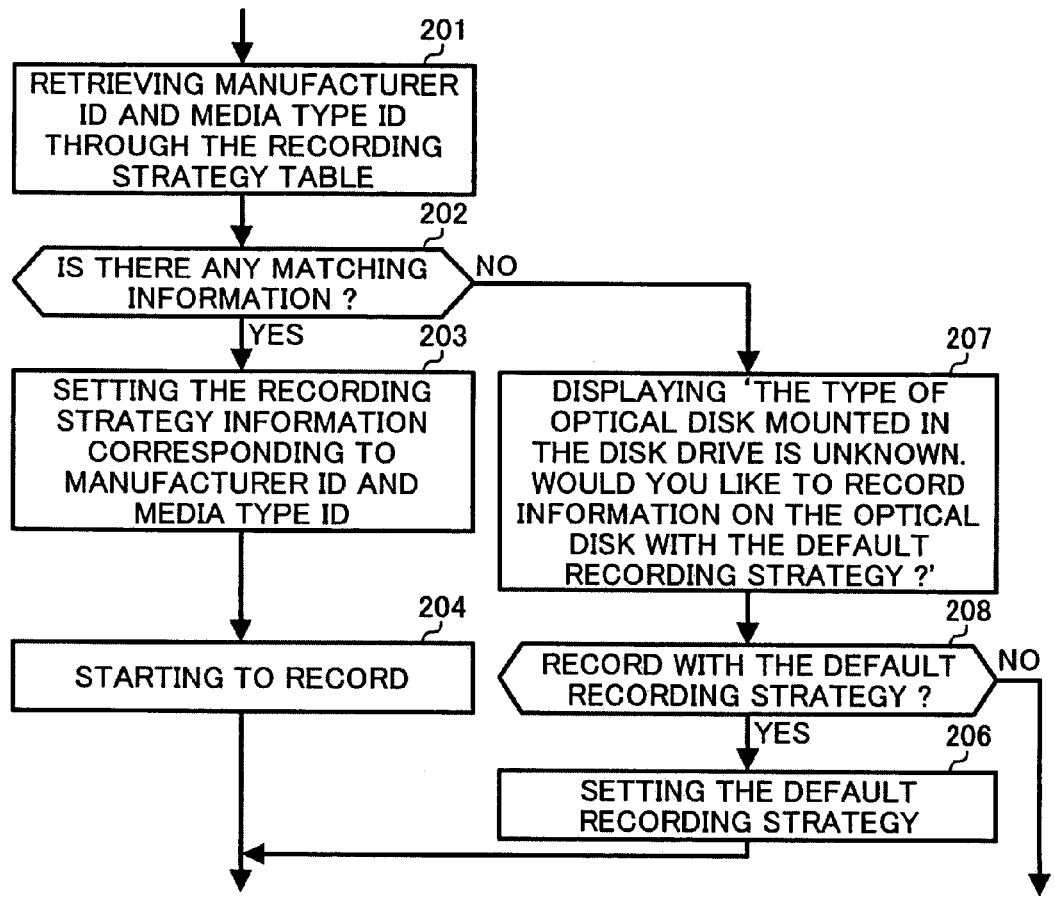
FIG. 9 is a flow chart which describes the precise operation of the controller 109 of the information recording apparatus, as the algorithm of the program executed by the controller 109, in the fifth and sixth embodiments in accordance with the present invention.

FIG. 4 is a block diagram of the fifth embodiment of an information recording system which has an information recording apparatus and a host computer coupled to each other, in accordance with the present invention. FIG. 5 is a block diagram of the sixth embodiment of an information recording system which has an information recording apparatus and a host computer coupled to each other, in accordance with the present invention. FIG. 9 is a flow chart which describes the precise operation of the controller 109, as the algorithm of the program executed by the controller 109, in the fifth and sixth embodiments in accordance with the present invention. This operation is executed by the CPU of the controller 109. In the fifth and sixth embodiments, the CPU of the controller 109 does the operation described in FIG. 9 instead of the operation described in FIG. 8 in the third and forth embodiments, respectively. The operation in the flow chart of FIG. 9 has steps 207 and 208 instead of the operation of step 205 in FIG. 8.

In step 207, the CPU of the controller 109 displays a message written below on the display device 112, via the CPU 118 of the host computer 105 or directly, when the optical disk 101 mounted in the optical disk recording apparatus 10 is an optical disk whose optimum recording strategy is unknown. The CPU of the controller 109 asks the user whether the user wants to record information on the optical disk with the default strategy, by a message such as, for example, 'The type of optical disk mounted in the disk drive is unknown. Would you like to record information on the optical disk with the default recording strategy?'

In step 208, the CPU of the controller 109 monitors input signal from an input device 116 coupled to the host computer 105 or display device 112, and determines which option the user selects. In the fifth embodiment, the input device 116 is coupled to the host computer 105, and the CPU of the controller 109 monitors input signal from the input device 116 through the host computer 105. In the sixth embodiment, the input device 116 is coupled to the display device 112, and the CPU of the controller 109 monitors input signal from the input device 116 through the display device 112. The option is that the optical disk recording apparatus 10 records information on the optical disk 101 with the default recording strategy and that the optical disk recording apparatus 10 does not record information on the optical disk 101. When the user chooses the option that the optical disk recording apparatus 10 records information on the optical disk 101 with the default recording strategy, then the CPU of the controller executes the process of step 206. In this case, the default recording strategy setting device determines the recording strategy of unknown optical disk. That is, the input device 116 configured to receive an input of an option which a user selects, from options between (1) recording information on the optical disk 101 with the recording strategy for an unknown optical disk (the default recording strategy), or (2) refraining from recording information on the optical disk 101, when the recording strategy corresponding to the type of said information recording medium is not found in the recording strategy storage device 111. The CPU of the controller 109 executes the operation of the option determining device 117 which determines which option the user selects by an input signal from the input device 116, in this embodiment.

In the fifth and sixth embodiments, the user can select to record information on the optical disk 101 after updating the recording strategy information or to record information on the optical disk 101 with the default recording strategy promptly, when the optical disk type information that is sent from the optical disk type discriminating device 108 does not exist in the recording strategy storage device 111. That is, the user can determine which option to take, depending on the attitude of the user including whether the user considers the quality of the recording important and how the user wants to use his or her time.

Seventh Embodiment

Figure 12:
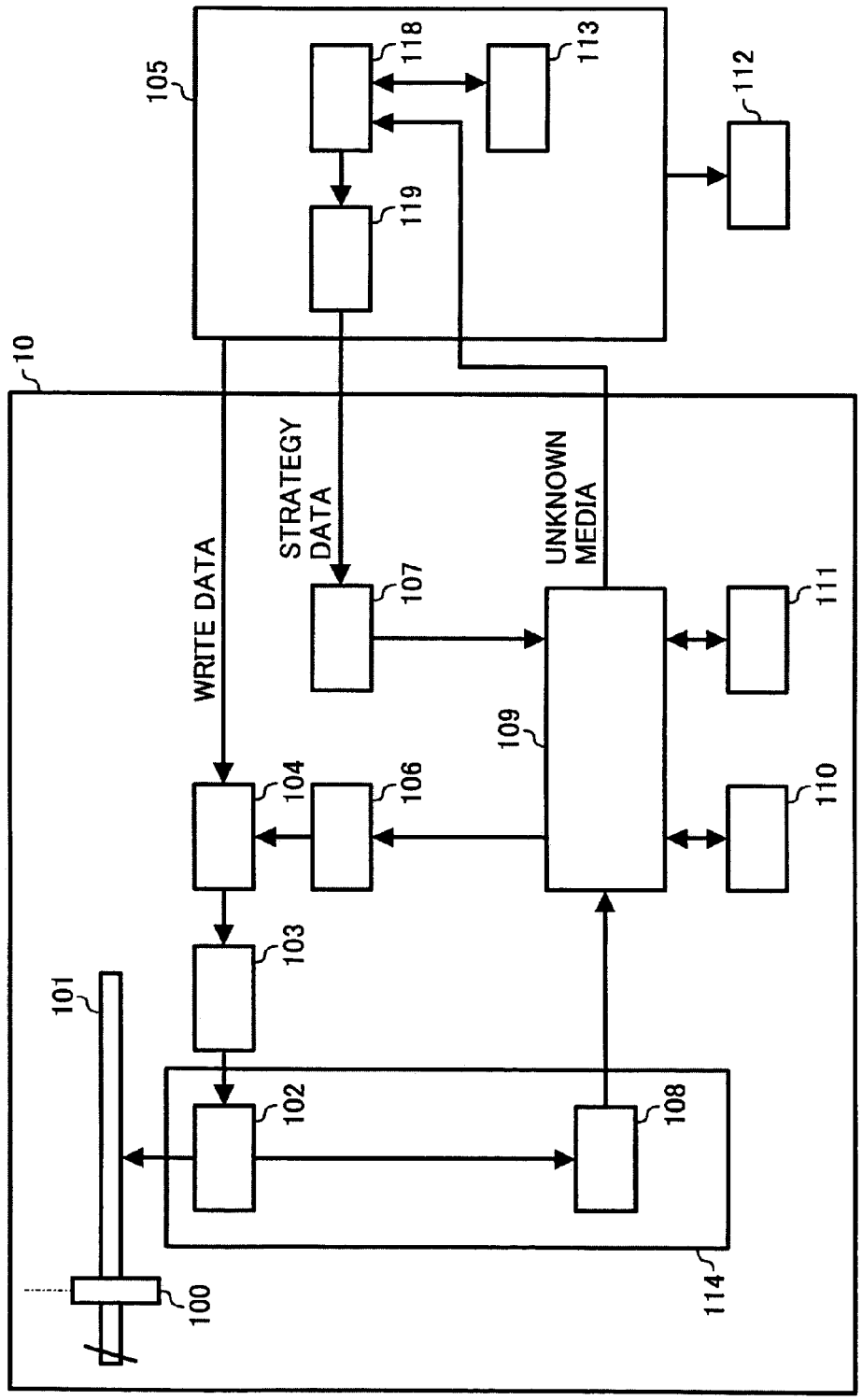
FIG. 12 is a block diagram of the seventh preferred embodiment of an information recording system which has an information recording apparatus and a host computer coupled to each other, in accordance with the present invention.

FIG. 12 is a block diagram of the seventh preferred embodiment of an information recording system which has an information recording apparatus and a host computer coupled to each other, in accordance with the present invention. The seventh embodiment is different from the first embodiment in the points described below. The host computer 105 comprises a calculating apparatus such as a personal computer (hereinafter referred to as PC). The host computer 105 has a CPU, a memory, an input device 116 including a keyboard and a mouse, a display (corresponding to the display device 112) and an interface circuit that interfaces between the host computer 105 and an optical disk recording apparatus 10 such as the one described in the first embodiment. The CPU 118 of the host computer 105 is executed by the software 113 stored in the storage device arranged in the host computer 105.

The host computer 105 works as written below. The CPU 118 of the host computer 105 runs the software 113. The host computer 105 sends the recording data to an optical disk recording apparatus 10 such as described in the first embodiment through the interface circuit. The host computer 105 receives the notification that the optical disk 101 is an unknown disk from the optical disk recording apparatus 10 and displays a message and options for the user on the display device 112 in response to the notification. After that, the host computer 105 instructs the optical disk recording apparatus 10 to operate in response to the option that the user chooses and is input by the user. The host computer 105 sends the updating data including the recording strategy information and the control program of the optical disk recording apparatus 10.

Figure 14:
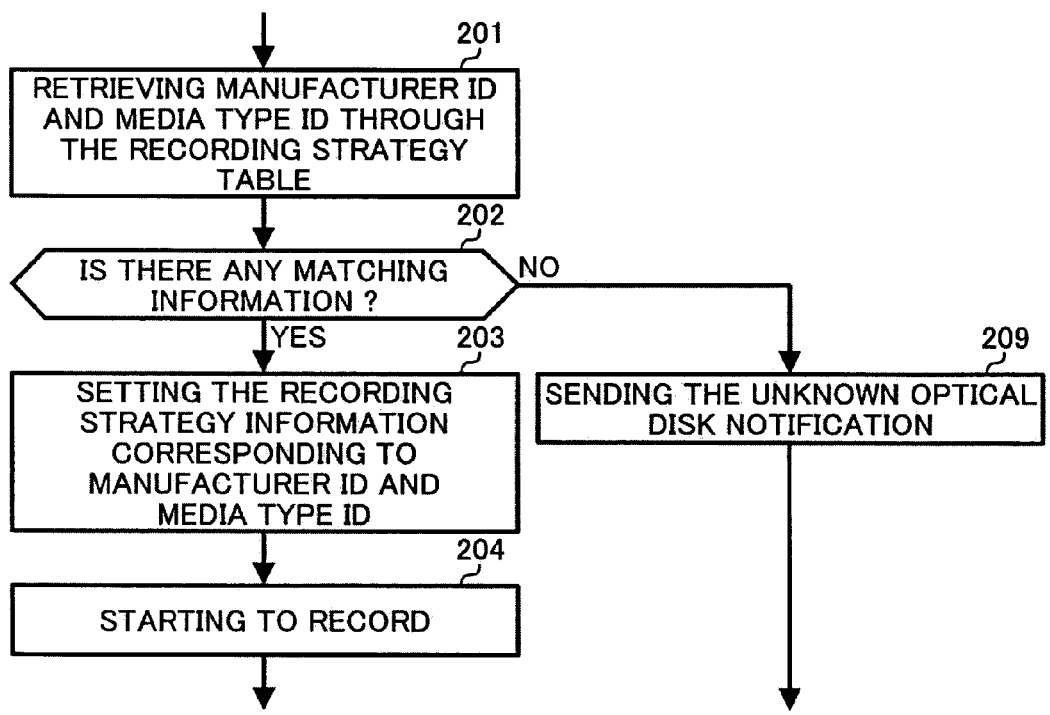
FIG. 14 is a flow chart which describes the precise operation of the controller 109 of the information recording apparatus, as the algorithm of the program executed by the controller 109, in the seventh embodiment in accordance with the present invention.

FIG. 14 is a flow chart which describes the precise operation of the controller 109 of the information recording apparatus, as the algorithm of the program executed by the controller 109, in the seventh embodiment in accordance with the present invention. This operation is executed by the CPU of the controller 109. The operation is executed before the information recording apparatus starts to record information on the recording medium mounted therein. The operation in the flow chart of FIG. 14 has step 209 instead of step 205 of FIG. 7.

In step 205, the optical disk type information that is sent from the optical disk type discriminating device 108 does not exist in the recording strategy table. The optical disk type information comprises Manufacturer ID, which indicates the manufacturer of the optical disk 101, and Media Type ID, which indicates the type of the optical disk 101. So the CPU of the controller 109 determines that the optical disk 101 mounted in the optical disk recording apparatus 10 is an optical disk whose optimum recording strategy is unknown (the optimum strategy of the optical disk 101 can not be determined). The CPU of the controller 109 notifies that the optical disk 101 mounted in the optical disk recording apparatus 10 is an optical disk whose optimum recording strategy is unknown, to the CPU 118 of the host computer 105. Hereinafter this notification is referred to as unknown optical disk notification. The unknown optical disk notification may be data including a text message and a numerical value code.

Figure 15:
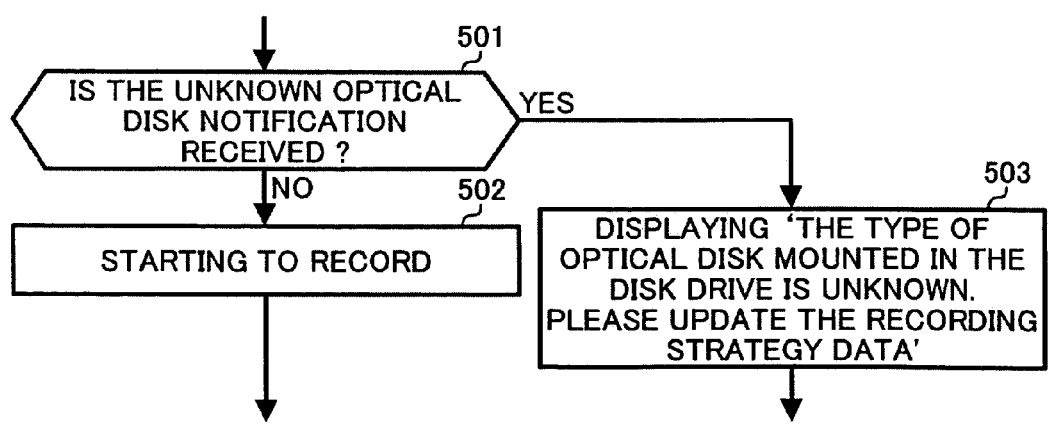
FIG. 15 is a flow chart which describes the precise operation of the CPU 118 of the host computer 105, as the algorithm of the software 113 executed by the CPU 118 of the host computer 105, in the seventh embodiment in accordance with the present invention.

FIG. 15 is a flow chart which describes the precise operation of the CPU 118 of the host computer 105, as the algorithm of the software 113 executed by the CPU 118 of the host computer 105, in the seventh embodiment in accordance with the present invention. This operation is executed by the CPU 118 of the host computer 105.

In step 501, the CPU 118 of the host computer 105 monitors whether the unknown optical disk notification is sent from the information recording apparatus that is subordinated to the host computer 105. When the unknown media notification is not sent, the CPU 118 of the host computer 105 sends the write data to the laser driver 104 and causes the information recording apparatus to continue to record information without change, in step 502. In step 503, the CPU 118 of the host computer 105 displays the message that the optical disk 101 mounted in the optical disk recording apparatus 10 is an optical disk whose optimum recording strategy is unknown, on the display device 112, when the unknown media notification is sent. The message may be 'The type of optical disk mounted in the disk drive is unknown. Please update the recording strategy data,' for example. In this case, the host computer 105 does not send the write data to the laser driver 104.

In addition, the message such as 'Please update the recording strategy data' and the notification which means such as the message is not necessarily needed. It is enough that the CPU of host computer 105 simply displays on the display device 112 that the optical disk 101 mounted in the optical disk recording apparatus 10 is an optical disk whose optimum recording strategy is unknown.

In the seventh embodiment explained above, the optical disk recording apparatus 10 can notify users when the optical disk 101 mounted in the optical disk recording apparatus 10 is an optical disk whose optimum recording strategy is unknown. Accordingly, the possibility is reduced that the optical disk recording apparatus 10 records information on the optical disk 101 under bad recording conditions. Moreover, the optical disk recording apparatus 10 avoids recording information on the optical disk 101 with a recording strategy which is not optimum by not recording information on the optical disk 101 when the optical disk 101 is an optical disk whose optimum recording strategy is unknown. So the possibility is reduced that the optical disk recording apparatus 10 records information on the optical disk 101 under bad recording conditions. There is a possibility not only that the information recorded cannot be read but that information which has been recorded on the optical disk 101 cannot be read if the information recorded is index information, such as directory information, when the optical disk recording apparatus 10 records information under bad recording conditions.

In addition, the CPU of the controller 109 in the seventh embodiment notifies the host computer 105 or displays on the display device 112 that the recording strategy information should be updated. This enables the user to obtain a more appropriate recording strategy from the manufacturer of the optical disk recording apparatus 10 and to update the information for the optical disk 101 stored in the optical disk recording apparatus 10, including recording strategy information and optical disk type information. When the optimum recording strategy of the optical disk 101 is stored in the recording strategy storage device 111 by updating the recording strategy information, the optical disk recording apparatus 10 can record information on the optical disk 101 with the optimum recording strategy.

The recording strategy information that should be updated can be uploaded onto the web site of the manufacturer of the optical disk recording apparatus 10 at regular intervals, for example. Users can download the recording strategy information from the web site and send the recording strategy information from the update control device 119 of the host computer 105 (the user's personal computer, for example) to the recording strategy updating device 107 of the optical disk recording apparatus 10. The operation of the update control device 119 to send the recording strategy is executed by the CPU 118 of the host computer 105. In this case, the recording strategy updating device 107 receives the recording strategy information that is about to be updated from the update control device 119 (the CPU 118 of the host computer 105) and updates the content of the recording strategy storage device 111 as is described above. That is, the recording strategy updating device 107 updates the recording strategy information data of the predetermined optical disk 101 corresponding to the recording strategy information data received from the host computer.

The optical disk recording apparatus 10 and the host computer 105 can be made up so as to update not only the recording strategy information but also the control program for controlling the operation of updating the recording strategy information, when updating the contents of the recording strategy storage device 111. In this case, the user can define new parameters of the recording strategy and add to the recording strategy storage device 111 through the CPU 118 of the host computer 105. The recording strategy updating device 107 receives the recording strategy information that is about to be updated from the CPU 118 of the host computer 105 and updates the content of the recording strategy storage device 111 as is described above. That is, the recording strategy updating device 107 updates the recording strategy information data of the predetermined optical disk 101 corresponding to the recording strategy information data received from the host computer. Or the recording strategy updating device 107 adds the new recording strategy information received from the host computer 105, and updates the control program of the optical disk recording apparatus 10 to update the contents of the recording strategy storage device 111 by the control program received from the host computer 105.

Eighth Embodiment

FIG. 16 is a flow chart which describes the precise operation of the controller 109 of the information recording apparatus, as the algorithm of the program executed by the controller 109, in the eighth embodiment in accordance with the present invention. This operation is executed by the CPU of the controller 109. The optical disk recording apparatus 10 and its host computer of the eighth embodiment is different from those of the seventh embodiment in the points written below. The operation in the flow chart of FIG. 16 has steps 210 and 211 after step 209 of FIG. 14.

Step 209 is an operation that is executed when the optimum recording strategy of the optical disk 101 mounted in the optical disk recording apparatus 10 is unknown. In this step, the CPU of the controller 109 sends the unknown optical disk notification that the optical disk 101 mounted in the optical disk recording apparatus 10 is an optical disk whose optimum recording strategy is unknown, to the CPU 118 of the host computer 105. The CPU 118 of the host computer 105 sends the proceeding notification that the optical disk recording apparatus 10 continues to record information on the optical disk 101 to the CPU of the controller 109, as the CPU 118 of the host computer receives the unknown optical disk notification. The proceeding notification is sent as the need arises.

In step 210, the CPU of the controller 109 monitors whether the proceeding notification is sent from the CPU 118 of the host computer 105. When the proceeding notification is not sent, the CPU of the controller 109 controls the part of the optical disk recording apparatus 10 including the laser driver 104 and makes the optical disk recording apparatus 10 not record information on the optical disk 101. In step 211, the proceeding notification is sent from the CPU 118 of the host computer 105 in case that the optical disk 101 is an optical disk whose optimum recording strategy is unknown. The CPU of the controller 109 sets the recording strategy corresponding to the strategy name 'Default' in the recording strategy table stored in the recording strategy storage device 111, to the recording strategy setting device 106. The laser driver 104 drives the light source 103 based on the recording strategy being set by the recording strategy setting device 106 and the write data sent from host computer 105. The information is recorded on the optical disk 101 by the light beam from the light source 103.

The recording strategy corresponding to the strategy name 'Default' is not necessarily the optimum strategy for the optical disk 101. Nevertheless the recording strategy corresponding to the strategy name 'Default' is set so as to record information on the optical disk 101 with such quality that there is not much trouble to read out the information recorded on the optical disk 101, whatever type the optical disk 101 is. Such recording strategy can be obtained by averaging the parameters of the optimum recording strategies corresponding to many types of optical disks, for example.

The CPU of the controller 109 makes the optical disk recording apparatus 10 not record information on the optical disk 101 when the proceeding notification is not sent, as written above. Despite this, the CPU of the controller 109 executes the algorithm described in FIGS. 10 and 11, when the updating data including the recording strategy information and the control program of the optical disk recording apparatus 10 is sent from the host computer 105.

Ninth Embodiment

Figure 13:
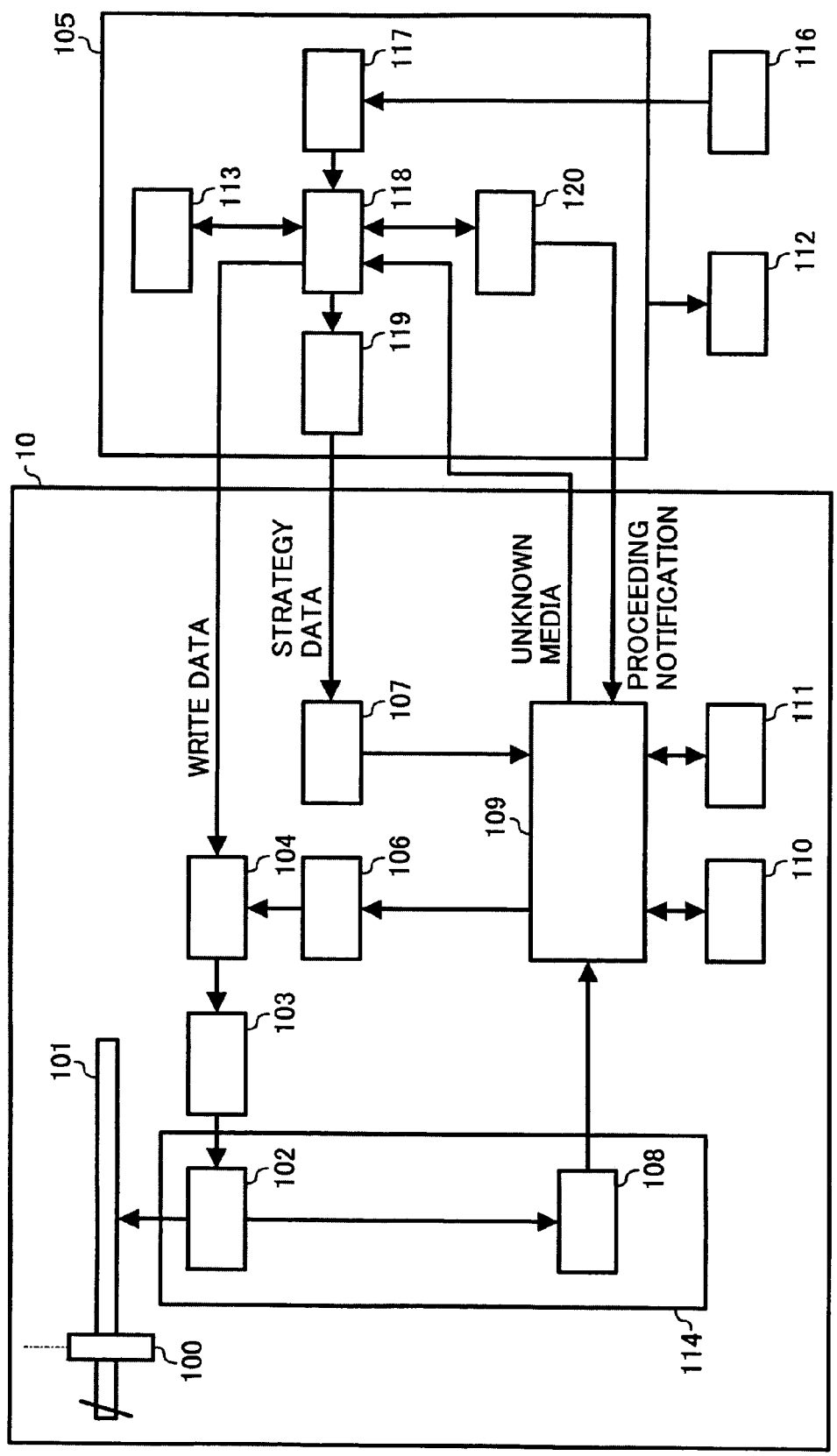
FIG. 13 is a block diagram of the ninth preferred embodiment of an information recording system which has an information recording apparatus and a host computer coupled to each other, in accordance with the present invention.

FIG. 13 is a block diagram of the ninth embodiment of an information recording system which has an information recording apparatus and a host computer coupled to each other, in accordance with the present invention. FIG. 17 is a flow chart which describes the precise operation of the CPU 118 of the host computer 105, as the algorithm of the software 113 executed by the CPU 118 of the host computer 105, in the ninth embodiment in accordance with the present invention. This operation is executed by the CPU 118 of the host computer 105. In the ninth embodiment, the CPU 118 of the host computer 105 executes the algorithm of the software 113 of the host computer 105 described in FIG. 17 instead of the algorithm of the software 113 of the host computer 105 described in FIG. 15 in the seventh embodiment.

In step 601, the CPU 118 of the host computer 105 monitors whether the unknown optical disk notification is sent from the information recording apparatus that is subordinated to the host computer 105. When the unknown media notification is not sent, the CPU 118 of the host computer 105 sends the write data to the laser driver 104 and makes the information recording apparatus start to record information without change, in step 603. In step 604, the CPU 118 of the host computer 105 displays a message such as 'The type of optical disk mounted in the disk drive is unknown. Would you like to record information on the optical disk with the default recording strategy?' and choice for the user (Yes or No for example) on the display device 112. The user inputs the choice whether he or she would like to record information with the default recording strategy from the input device 116 which is coupled to the host computer 105, referring to the information displayed on the display device 112.

The CPU 118 of the host computer 105 determines whether the user chooses to record information with the default recording strategy according to the input signal from the input device 116 in step 605. When the choice of the user is 'Yes' (the user chooses to record information with the default recording strategy), the CPU 118 of the host computer 105 sends the proceeding notification to the CPU of the controller 109 and makes the information recording apparatus start to record information, in step 603. That is, the CPU 118 of the host computer 105 executes the operation of an option determining device 117 which determines which option the user selects by an input signal from an input device 116, by means of the software 113, in this embodiment. The CPU 118 of the host computer 105 also executes the operation of a recording control device 120 which controls the optical recording apparatus to execute the operation to record information on the optical disk 101 with the recording strategy for an unknown optical disk, when the user selects the operation to record information on the optical disk 101 with the recording strategy for an unknown optical disk, by means of the software 113, in this embodiment.

In this case, the host computer 105 can notify users when the optical disk 101 mounted in the optical disk recording apparatus 10 is an optical disk whose optimum recording strategy is unknown, by the display on the display device 112. So the host computer 105 can make the user feel like updating the recording strategy information. In addition, the user has an alternative to record information on the optical disk mounted in the optical disk recording apparatus 10 under passable conditions promptly, as the user inputs 'Yes' with the input device 116. The latter may be convenient for the user who doesn't have enough time to update the recording information when the user starts recording. In this case, the quality of the recording can be acceptable, though it may not be the best quality.

When the choice of the user is 'No' (the user chooses not to record information with the default recording strategy), the CPU 118 of the host computer 105 sends the recording strategy information that is about to be updated to the recording strategy updating device 107, in step 608. The recording strategy information that should be updated can be uploaded onto the web site of the manufacturer of the optical disk recording apparatus 10 at regular intervals, for example. Users can download the recording strategy information from the web site, store the recording strategy information into the host computer 105, and send the recording strategy information from the host computer 105 to the recording strategy updating device 107 of the optical disk recording apparatus 10. It is also possible that the host computer 105 executes the automatic operation such as the host computer 105 connected to the web site of the manufacturer, downloads the recording strategy information, sends the recording strategy information to the recording strategy updating device 107 of the optical disk recording apparatus 10.

The optical disk recording apparatus 10 and the host computer 105 can be made up so as to update not only the recording strategy information but also the control program of the controller 109 (the control program for controlling the operation of updating the recording strategy information), as written above. The CPU 118 of the host computer 105 executes the operation of monitoring the unknown optical disk notification in step 601 again, after sending the recording strategy information or both of the recording strategy information and the control program to the recording strategy updating device 107.

In this case, the user can select to record information on the optical disk 101 after updating the recording strategy information or to record information on the optical disk 101 with the default recording strategy promptly, when the optical disk 101 is an unknown optical disk. That is, the user can determine which option to take, depending on the user's attitude or state of mind, including whether the user considers the quality of the recording important and how the user wants to use his or her time.

According to the present invention, there is provided an information recording apparatus, an information recording system and an information recording method, that increases the possibility for recording information on an information recording medium at an applicable recording condition, even when the recording strategy corresponding to the type of the information recording medium is unknown.

According to the present invention, there is provided a computer, that can control an information recording apparatus so as to increase the possibility for recording information on an information recording medium at an applicable recording condition, even when the recording strategy corresponding to the type of the information recording medium is unknown.

According to the present invention, there is provided a computer program product and a computer readable storage medium which stores a computer program, that can execute a computer to control information recording apparatus so as to increase the possibility for recording information on an information recording medium at an applicable recording condition, even when the recording strategy corresponding to the type of the information recording medium is unknown.

The present invention is not limited to the above described embodiments. Various variations and modifications may be made without departing from the scope of the present invention.

The present application contains subject matter related to Japanese patent application no. JPAP 2003-156952, filed in the Japanese Patent Office on Jun. 2, 2003. The entire contents of Japanese patent application no. JPAP 2003-156952 are incorporated herein by reference.

What is claimed is:

1. An information recording apparatus for recording information on an information recording medium by transmitting a light beam onto said information recording medium, comprising:
   an information reading device configured to read information as to the type of said information recording medium;
   a recording strategy storage device configured to store a recording strategy corresponding to an information recording medium type;
   an unknown information recording medium notification device configured to send an unknown information recording medium notification, when the recording strategy corresponding to the type of said information recording medium is not found in said recording strategy storage device; and
   a message sending device configured to send a message promoting a user to obtain a new recording strategy, in response to said unknown information recording medium notification.

2. An information recording apparatus according to claim 1, wherein said unknown information recording medium notification device is configured to send said unknown information recording medium notification to a computer.

3. An information recording apparatus according to claim 1, wherein said unknown information recording medium notification device is configured to send said unknown information recording medium notification to said message sending device, and
   wherein said message sending device is configured to send a message telling said user that the recording strategy for the information recording medium is unknown, in response to said unknown information recording medium notification.

4. An information recording apparatus according to claim 3, further comprising a recording strategy updating device configured to update the content stored in the recording strategy storage device, and
   wherein said message sending device is configured to send a message promoting said user to update the content stored in said recording strategy storage device.

5. An information recording apparatus according to claim 1, further comprising a recording strategy determining device configured to record information on said information recording medium based on the recording strategy corresponding to the type of said information recording medium, when the recording strategy corresponding to the type of said information recording medium is found in the recording strategy storage device.

6. An information recording apparatus according to claim 1, wherein said recording strategy determining device is configured to determine a recording strategy for an unknown information recording medium, when the recording strategy corresponding to the type of said information recording medium is not found in the recording strategy storage device, and
   wherein said information recording apparatus records information with said recording strategy for an unknown information recording medium.

7. An information recording apparatus according to claim 6, further comprising:
   an input device configured to receive an input of an option which a user selects, from options including (a) recording information on said information recording medium with said recording strategy for an unknown information recording medium and (b) refraining from recording information on said information recording medium, when the recording strategy corresponding to the type of said information recording medium is not found in said recording strategy storage device; and
   an option determining device configured to determine which option said user selects by an input signal from said input device;
   wherein said recording strategy determining device is configured to determine said recording strategy for an unknown information recording medium, when said user selects the operation to record information on said information recording medium with said recording strategy for an unknown information recording medium.

8. A computer for use with an information recording apparatus which is configured to record information on an information recording medium by focusing a light beam emitted from a light source on said information recording medium, wherein said information recording apparatus includes:
   an information reading device of a type of the information recording medium configured to read information as to the type of said information recording medium recorded thereon;
   a recording strategy storage device configured to store a recording strategy corresponding to an information recording medium type; and
   an unknown information recording medium notification device configured to send an unknown information recording medium notification, when the recording strategy corresponding to the type of said information recording medium is not found in said recording strategy storage device;
   said computer comprising a message sending device configured to send a message telling a user that the information recording medium is an unknown information recording medium and further configured to promote a user to obtain a new recording strategy, in response to said unknown information recording medium notification.

9. A computer according to claim 8, wherein said information recording apparatus includes a recording strategy determining device configured to record information on said information recording medium based on the recording strategy corresponding to the type of said information recording medium, when the recording strategy corresponding to the type of said information recording medium is found in the recording strategy storage device.

10. A computer according to claim 9, wherein said recording strategy determining device is configured to determine a recording strategy for an unknown information recording medium, when a recording strategy corresponding to the type of said information recording medium is not found in the recording strategy storage device; and
   wherein said message sending device is configured to send a message relating to options between recording information on said information recording medium with said recording strategy for an unknown information recording medium, and refraining from recording information on said information recording medium, in response to said unknown information recording medium notification;

said computer further comprising:

an input device configured to receive an input of an option which a user selects, from options between recording information on said information recording medium with said recording strategy for an unknown information recording medium and refraining from recording information on said information recording medium, when the recording strategy corresponding to the type of said information recording medium is not found in said recording strategy storage device, an option determining device configured to determine which option said user selects by an input signal from an input device, and a recording control device configured to control said information recording apparatus to execute the operation to record information on said information recording medium with said recording strategy for an unknown information recording medium, when said user selects the operation to record information on said information recording medium with said recording strategy for an unknown information recording medium.

11. A computer according to claim 8, wherein said information recording apparatus further includes a recording strategy updating device configured to update the content stored in the recording strategy storage device, for enabling said computer to execute a process; and wherein said message sending device is configured to send a message promoting said user to update the content stored in said recording strategy storage device, in response to said unknown information recording medium notification.

12. An information recording method for recording information on an information recording medium, comprising the steps of:

reading information as to the type of said information recording medium recorded on the information recording medium;

sending an unknown information recording medium notification, when the recording strategy corresponding to the type of said information recording medium is unknown; and sending a message configured to promote a user to obtain a new recording strategy, in response to said unknown information recording medium notification.

13. An information recording method according to claim 12, wherein said unknown information recording medium notification is sent to a computer.

14. An information recording method according to claim 12, further comprising the step of sending a message telling a user that the information recording medium is an unknown information recording medium, in response to said unknown information recording medium notification.

15. An information recording method according to claim 12, further comprising the step of recording information on said information recording medium based on the recording strategy corresponding to the type of said information recording medium, when the recording strategy corresponding to the type of said information recording medium is known.

16. An information recording system, comprising:

an information recording apparatus and a computer connected to each other; and wherein said information recording apparatus is configured to record information on an information recording medium by focusing a light beam emitted from a light source on said information recording medium, said information recording apparatus including:

an information reading device of a type of the information recording medium configured to read information as to the type of said information recording medium recorded thereon;

a recording strategy storage device configured to store a recording strategy corresponding to an information recording medium type; and an unknown information recording medium notification device configured to send an unknown information recording medium notification to said computer, when the recording strategy corresponding to the type of said information recording medium is not found in said recording strategy storage device;

wherein said computer includes a message sending device configured to send a message telling a user that the information recording medium is an unknown information recording medium and further configured to promote a user to obtain a new recording strategy, in response to said unknown information recording medium notification.

17. An information recording system according to claim 16, wherein said information recording apparatus has a recording strategy determining device configured to record information on said information recording medium based on the recording strategy corresponding to the type of said information recording medium, when the recording strategy corresponding to the type of said information recording medium is found in the recording strategy storage device.

18. An information recording system according to claim 17, wherein said recording strategy determining device is configured to determine a recording strategy for an unknown information recording medium, when the recording strategy corresponding to the type of said information recording medium is not found in the recording strategy storage device, and said message sending device is configured to send a message relating to options between recording information on said information recording medium with said recording strategy for an unknown information recording medium, and refraining from recording information on said information recording medium, in response to said unknown information recording medium notification; and wherein said computer includes:

an input device configured to receive an input of an option which a user selects, from options between recording information on said information recording medium with said recording strategy for an unknown information recording medium, and refraining from recording information on said information recording medium, when the recording strategy corresponding to the type of said information recording medium is not found in said recording strategy storage device;

an option determining device configured to determine which option said user selects by an input signal from said input device; and a recording control device configured to control said information recording apparatus to execute the operation to record information on said information recording medium with said recording strategy for an unknown information recording medium, when said user selects the operation to record information on said information recording medium with said recording strategy for an unknown information recording medium.

19. An information recording system according to claim 16, wherein said information recording apparatus has a recording strategy updating device configured to update the content stored in the recording strategy storage device, for enabling said computer to execute a process, and
said message sending device is configured to send a message promoting said user to update the content stored in said recording strategy storage device, in response to said unknown information recording medium notification.

20. An information recording system according to claim 19, wherein said computer includes an update control device configured to control said information recording apparatus to update the content stored in said recording strategy storage device, in response to said unknown information recording medium notification.

21. An information recording apparatus for recording information on an information recording medium by focusing a light beam emitted from a light source on said information recording medium, comprising:
information reading means for reading information as to the type of said information recording medium recorded thereon;
recording strategy storing means for storing a recording strategy corresponding to an information recording medium type;
unknown information recording medium notifying means for sending an unknown information recording medium notification, when the recording strategy corresponding to the type of said information recording medium is not found in said recording strategy storage device; and
a message sending means configured to send a message promoting a user to obtain a new recording strategy, in response to said unknown information recording medium notification.

22. An information recording apparatus according to claim 21, further comprising a recording strategy determining means for recording information on said information recording medium based on the recording strategy corresponding to the type of said information recording medium, when the recording strategy corresponding to the type of said information recording medium is found in the recording strategy storage means.

23. An information recording apparatus according to claim 22 wherein said recording strategy determining means includes means for determining a recording strategy for an unknown information recording medium, when the recording strategy corresponding to the type of said information recording medium is not found in the recording strategy storage means; and
wherein said information recording apparatus records information with said recording strategy for an unknown information recording medium.

24. An information recording apparatus according to claim 23 further comprising:
input means for receiving an input of an option which a user selects, from options between recording information on said information recording medium with said recording strategy for an unknown information recording medium, and refraining from recording information on said information recording medium, when the recording strategy corresponding to the type of said information recording medium is not found in said recording strategy storage means; and
option determining means for determining which option said user selects by an input signal from said input means;
wherein said recording strategy determining means determines said recording strategy for an unknown information recording medium, when said user selects the operation to record information on said information recording medium with said recording strategy for an unknown information recording medium.

25. An information recording apparatus according to claim 21, further comprising a recording strategy updating means for updating the content stored in the recording strategy storage means; and
wherein said unknown information recording medium notifying means includes means for sending said unknown information recording medium notification to said message sending means, and
wherein said message sending means includes means for sending a message telling a user that the information recording medium is an unknown information recording medium, in response to said unknown information recording medium notification, and a message promoting a user to update the content stored in said recording strategy storage means.

26. An information recording system, comprising:
an information recording apparatus; and
a computer connected to said information recording apparatus; and
wherein said information recording apparatus is configured to record information on an information recording medium by focusing a light beam emitted from a light source on said information recording medium; and
wherein said information recording apparatus includes:
information reading means for reading information as to the type of said information recording medium recorded thereon;
recording strategy storage means for storing a recording strategy corresponding to an information recording medium type;
unknown information recording medium notification means for sending an unknown information recording medium notification to said computer, when the recording strategy corresponding to the type of said information recording medium is not found out in said recording strategy storage means;
wherein said computer includes message sending means for sending a message telling a user that the information recording medium is an unknown information recording medium and for sending a message promoting the user to obtain a new recording strategy, in response to said unknown information recording medium notification.

27. An information recording system according to claim 26, wherein said information recording apparatus includes a recording strategy determining means for recording information on said information recording medium based on the recording strategy corresponding to the type of said information recording medium, when the recording strategy corresponding to the type of said information recording medium is found in the recording strategy storage means.

28. An information recording system according to claim 27, wherein said recording strategy determining means determines a recording strategy for an unknown information recording medium, when the recording strategy corresponding to the type of said information recording medium is not found in the recording strategy storage means, and
wherein said message sending means sends a message relating to options between recording information on said information recording medium with said recording strategy for an unknown information recording medium, and refraining from recording information on said information recording medium, in response to said unknown information recording medium notification; and wherein said computer further comprises:

input means for receiving an input of an option which a user selects;

option determining means for determining which option said user selects by an input signal from said input means; and recording control means for controlling said information recording apparatus to execute the operation to record information on said information recording medium with said recording strategy for an unknown information recording medium, when said user selects the operation to record information on said information recording medium with said recording strategy for an unknown information recording medium.

29. An information recording system according to claim 26, wherein said information recording apparatus includes a recording strategy updating means for updating the content stored in the recording strategy storage device, for enabling said computer to execute a process, and said message sending means includes means for sending a message promoting said user to update the content stored in said recording strategy storage means, in response to said unknown information recording medium notification.

30. An information recording system according to claim 29, wherein said computer further comprises update control means for controlling said information recording apparatus to update the content stored in said recording strategy storage means, in response to said unknown information recording medium notification.

* * * * *